(12) United States Patent
Takemori et al.

(10) Patent No.: US 10,931,464 B2
(45) Date of Patent: *Feb. 23, 2021

(54) COMMUNICATION SYSTEM, HARDWARE SECURITY MODULE, TERMINAL DEVICE, COMMUNICATION METHOD, AND PROGRAM

(71) Applicant: KDDI CORPORATION, Tokyo (JP)

(72) Inventors: Keisuke Takemori, Tokyo (JP); Takamasa Isohara, Tokyo (JP); Teruaki Honma, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 101 days.

This patent is subject to a terminal disclaimer.

(21) Appl. No.: 16/079,924

(22) PCT Filed: Feb. 21, 2017

(86) PCT No.: PCT/JP2017/006340
§ 371 (c)(1),
(2) Date: Aug. 24, 2018

(87) PCT Pub. No.: WO2017/150270
PCT Pub. Date: Sep. 8, 2017

(65) Prior Publication Data
US 2019/0068381 A1 Feb. 28, 2019

(30) Foreign Application Priority Data
Feb. 29, 2016 (JP) .............................. JP2016-038445

(51) Int. Cl.
*H04L 29/06* (2006.01)
*H04L 9/32* (2006.01)
(Continued)

(52) U.S. Cl.
CPC ............ *H04L 9/3268* (2013.01); *G06F 21/33* (2013.01); *H04L 9/006* (2013.01); *H04L 9/08* (2013.01);
(Continued)

(58) Field of Classification Search
CPC ..... H04L 9/3268; H04L 9/0825; H04L 9/006; H04L 63/0823; G06F 21/33
(Continued)

(56) References Cited

U.S. PATENT DOCUMENTS 9,098,714 B2   8/2015  Sharp et al.
2002/0099663 A1 7/2002  Yoshino et al.
(Continued)

FOREIGN PATENT DOCUMENTS

EP    2 763 345 A      8/2014
JP    2004-072717 A    3/2004
(Continued)

OTHER PUBLICATIONS

Supplementary Partial European Search Report issued in European Patent Office (EPO) Patent Application No. 17759736.6, dated Jun. 25, 2019.
(Continued)

*Primary Examiner* — Evans Desrosiers
(74) *Attorney, Agent, or Firm* — Greenblum & Bernstein, P.L.C.

(57) ABSTRACT

A communication system is provided, including a plurality of terminal devices and a root certification authority. Each of the plurality of terminal devices includes a certification authority key generation unit, a certification authority public key certificate acquisition unit that acquires a certification authority public key certificate, a certification authority key storage unit, a transmission unit, and a verification unit that verifies the certification authority public key certificate with (Continued)

a root certification authority public key certificate, and verifies a user in a case where the verification succeeds. The root certification authority includes a root certification authority key storage unit, a communication unit, and a certification authority public key certificate generation unit that generates the certification authority public key certificate by encrypting the certification authority public key with the root certification authority secret key. The communication unit transmits the certification authority public key certificate to a terminal device.

5 Claims, 11 Drawing Sheets

(51) Int. Cl.
*H04L 9/08* (2006.01)
*G06F 21/33* (2013.01)
*H04L 9/00* (2006.01)
*H04L 9/30* (2006.01)
*H04W 4/14* (2009.01)
*H04W 12/06* (2021.01)

(52) U.S. Cl.
CPC .......... *H04L 9/0825* (2013.01); *H04L 9/0861* (2013.01); *H04L 9/0894* (2013.01); *H04L 9/30* (2013.01); *H04L 9/32* (2013.01); *H04L 63/061* (2013.01); *H04L 63/0823* (2013.01); *H04W 4/14* (2013.01); *H04W 12/06* (2013.01); *H04L 2209/80* (2013.01)

(58) Field of Classification Search
USPC ....................................................... 713/156
See application file for complete search history.

(56) References Cited

U.S. PATENT DOCUMENTS

| | | |
|---|---|---|
| 2004/0111609 A1 | 6/2004 | Kaji et al. |
| 2004/0117623 A1 | 6/2004 | Kalogridis et al. |
| 2004/0148505 A1 | 7/2004 | Qiu |
| 2004/0158716 A1 | 8/2004 | Turtiainen et al. |
| 2004/0196981 A1 | 10/2004 | Nakano et al. |
| 2005/0204164 A1* | 9/2005 | Kakii .................... H04L 9/3268 726/5 |
| 2006/0177111 A1 | 8/2006 | Yano et al. |
| 2007/0136574 A1 | 6/2007 | Oh et al. |
| 2008/0285755 A1 | 11/2008 | Camus et al. |
| 2009/0204809 A1 | 8/2009 | Nasu et al. |
| 2009/0209232 A1 | 8/2009 | Cha et al. |
| 2009/0259851 A1 | 10/2009 | Faynberg et al. |
| 2010/0268942 A1* | 10/2010 | Hernandez-Ardieta ..................... H04L 9/006 713/156 |
| 2011/0047373 A1 | 2/2011 | Karasawa et al. |
| 2011/0113241 A1 | 5/2011 | Umezawa et al. |
| 2013/0073845 A1 | 3/2013 | Teranishi et al. |
| 2014/0143826 A1 | 5/2014 | Sharp et al. |
| 2014/0189808 A1 | 7/2014 | Mahaffey et al. |
| 2014/0208117 A1 | 7/2014 | Hayashi et al. |
| 2014/0359288 A1 | 12/2014 | Jensen et al. |
| 2015/0089216 A1 | 3/2015 | Benoit et al. |
| 2015/0304113 A1 | 10/2015 | Nix |
| 2016/0344559 A1 | 11/2016 | Ma et al. |

FOREIGN PATENT DOCUMENTS

| | | |
|---|---|---|
| JP | 2005-122567 A | 5/2005 |
| JP | 2005-223891 A | 8/2005 |
| JP | 2006-197127 A | 7/2006 |
| JP | 2008-538668 A | 10/2008 |
| JP | 2009-277184 A | 11/2009 |
| JP | 2012-182641 A | 9/2012 |
| JP | 2013-078042 A | 4/2013 |
| JP | 2004-248220 A | 9/2014 |

OTHER PUBLICATIONS

ITpro "information security introduction—PKI (the latter part)—structure of X.509 certificate and PKI," Internet URL: http://itpro.nikkeibp.co.jp/article/COLUMN/20060725/244233, together with English language translation, printed Feb. 29, 2016, pp. 1.
Keisuke Takemori et al., "Key Managements for ECU and Code Authentications Using Tamper-resistant Secure Element", The Institute of Electronics, Information and Communication Engineers, IEICE Technical Report, vol. 155, No. 365, with English language abstract, Dec. 10, 2015, pp. 227-232.
International Search Report issued in International Bureau of WIPO Patent Application No. PCT/JP2017/006340, dated May 23, 2017, along with an English translation thereof.
International Search Report in International Patent Application No. PCT/JP2016/080959, dated Dec. 6, 2016, along with an English translation thereof.
ITpro "Introduction to Information Security—PKI (Second Part)—X.509 Certificate and Structure of PKI", Internet<URL:http://itpro.nikkeibp.co.jp/article/COLUMN/20060725/244233/>, with partial English language translation, pp. 1-4, and one page English translation, Apr. 4, 2018.
Keisuke Takemori et al., "Key Managements for ECU and Code Authentications Using Tamper-resistant Secure Element", IEICE Technical Report, vol. 115, No. 366, (including English Abstract in the front page), Dec. 10, 2015, pp. 227-232.
May 14, 2019 Extended European Report in corresponding European Application No. 16857468.9.
Dec. 3, 2019 Notice of Reasons for Rejection in corresponding Japanese Application No. 2018-226809 and English translation thereof.
Berket et al., "PKI-based security for peer-to-peer information sharing", Proceedings, Fourth International Conference on Peer-to-Peer Computing, Date of Conference: Aug. 27, 2004.
Huang et al., "Multi-Authority Attribute Based Encryption Scheme with Revocation", 2015 24th International Conference on Computer Communication and Networks (ICCCN, Date of Conference: Aug. 3-6, 2015.
USPTO Non-Final Office Action, dated Sep. 19, 2019, in U.S. Appl. No. 15/769,231.
USPTO Notice of Allowance and Fee(s) Due, dated Feb. 3, 2020, in U.S. Appl. No. 15/769,231.

* cited by examiner

COMMUNICATION SYSTEM, HARDWARE SECURITY MODULE, TERMINAL DEVICE, COMMUNICATION METHOD, AND PROGRAM

TECHNICAL FIELD

The present invention relates to a communication system, a hardware security module, a terminal device, a communication method, and a program.

Priority is claimed on Japanese Patent Application No. 2016-038445, filed Feb. 29, 2016, the content of which is incorporated herein by reference.

BACKGROUND ART

A structure in which the same certification authority (certification authority: CA) application is installed in each of a plurality of secure elements (SE), and self-publication of a certification authority public key certificate is possible or an electronic signature can be attached is known.

In addition, as a technology for realizing concealment of communication data, a public key-encrypting method is known. In the public key-encrypting method, typically, a public key (public key certificate) is exchanged by using a public key infrastructure (PKI) (for example, refer to Non-Patent Literature 1).

CITATION LIST

Non-Patent Literature

[Non-Patent Literature 1]
ITpro, "information security introduction-PKI (the latter part)—structure of X.509 certificate and PKI", Internet <URL:http://itpro.nikkeibp.co.jp/article/COLUMN/20060725/24423 3/>

SUMMARY OF INVENTION

Technical Problem

In the method in which the same certification authority application is installed in each of the plurality of SEs, it is assumed that the certification authority public key certificate and the certification authority secret key are safely managed in the SEs. In a method in which the same certification authority public key certification and a certification authority secret key are transmitted to the plurality of SEs, in a case where an arbitrary SE is analyzed and the certification authority secret key is leaked, an unauthorized third party may issue a false client certification authority public key certificate. According to this, reliability of the client certification authority public key certificate is compromised, and the influence extends to the SEs to which the certification authority public key certificate is transmitted.

The invention has been made to solve the above-described problem, and an object thereof is to reduce an influence to SEs to which the certification authority public key certificate is transmitted even in a case where a certification authority public key certificate managed by an arbitrary SE is leaked.

Solution to Problem (1) According to an aspect of the invention, a communication system is provided, including a plurality of terminal devices and a root certification authority. Each of the plurality of terminal devices includes a certification authority key generation unit configured to generate a certification authority public key and a certification authority secret key that forms a pair with the certification authority public key, a certification authority public key certificate acquisition unit configured to transmit information, to which the certification authority public key generated by the certification authority key generation unit is attached and which makes a request for a certification authority public key certificate, to the root certification authority, and acquires the certification authority public key certificate transmitted from the root certification authority in response to the request, a certification authority key storage unit configured to store the certification authority public key certificate that is acquired by the certification authority public key certificate acquisition unit, and the certification authority secret key, a transmission unit configured to transmit the certification authority public key certificate, which is stored in the certification authority key storage unit, to another terminal device, and a verification unit configured to verify the certification authority public key certificate, which is transmitted from the other terminal device, with a root certification authority public key certificate, and verify a user of the other terminal device by using the certification authority public key certificate in a case where verification of the certification authority public key certificate succeeds. The root certification authority includes a root certification authority key storage unit configured to store the root certification authority public key certificate, and a root certification authority secret key, a communication unit configured to receive information that is transmitted from each of the plurality of terminal devices for making the request for the certification authority public key certificate, and a certification authority public key certificate generation unit configured to generate the certification authority public key certificate by encrypting the certification authority public key received by the communication unit with the root certification authority secret key stored in the root certification authority key storage unit. The communication unit transmits the certification authority public key certificate generated by the certification authority public key certificate generation unit to a terminal device that makes the request for the certification authority public key certificate.

(2) In the communication system of the aspect of the invention according to (1), each of the plurality of terminal devices may further include a certification authority public key invalidation-processing unit configured to acquire a certification authority public key certificate invalidation list from an invalidation management server that stores the certification authority public key certificate invalidation list including the certification authority public key certificate that is invalidated, and determines whether or not the certification authority public key certificate transmitted from the other terminal device is invalidated, and in a case where the certification authority public key invalidation-processing unit determines that the certification authority public key certificate transmitted from the other terminal device is not invalidated, the verification unit may verify the certification authority public key certificate transmitted from the other terminal device with the root certification authority public key certificate.

(3) In the communication system of the aspect of the invention according to (2), the certification authority public key invalidation-processing unit may configured to acquire the certification authority public key certificate invalidation list that is over-the-air (OTA)-transmitted by the invalidation management server.

(4) In the communication system of the aspect of the invention according to (2), the certification authority public key invalidation-processing unit may configured to acquire the certification authority public key certificate invalidation list by accessing the invalidation management server in accordance with a signal that is transmitted from an SMS server that provides a short message service for making a request for acquisition of the certification authority public key certificate invalidation list.

(5) According to another aspect of the invention, a hardware security module is provided, including: a root certification authority key storage unit configured to store a root certification authority public key certificate and a root certification authority secret key; a certification authority key generation unit configured to generate a certification authority public key and a certification authority secret key that forms a pair with the certification authority public key; a certification authority public key certificate generation unit configured to generate a certification authority public key certificate by encrypting the certification authority public key, which is generated by the certification authority key generation unit, with the root certification authority secret key stored in the root certification authority key storage unit; and an interface configured to store the certification authority public key certificate generated by the certification authority public key certificate generation unit, and the certification authority secret key in a secure element.

(6) According to still another aspect of the invention, a terminal device is provided, including: a certification authority key generation unit configured to generate a certification authority public key and a certification authority secret key that forms a pair with the certification authority public key; a certification authority public key certificate acquisition unit configured to transmit information, to which the certification authority public key generated by the certification authority key generation unit is attached and which makes a request for a certification authority public key certificate, to a root certification authority, and acquires the certification authority public key certificate transmitted from the root certification authority in response to the request; a certification authority key storage unit configured to store the certification authority public key certificate that is acquired by the certification authority public key certificate acquisition unit, and the certification authority secret key; a transmission unit configured to transmit the certification authority public key certificate, which is stored in the certification authority key storage unit, to another terminal device; and a verification unit configured to verify the certification authority public key certificate, which is transmitted from the other terminal device, with a root certification authority public key certificate, and verify a user of the other terminal device by using the certification authority public key certificate in a case where verification of the certification authority public key certificate succeeds.

(7) According to still another aspect of the invention, a communication method that is executed by a communication system is provided, including a plurality of terminal devices and a root certification authority. Each of the plurality of terminal devices generates a certification authority public key and a certification authority secret key that forms a pair with the certification authority public key, transmits information, to which the certification authority public key is attached and which makes a request for a certification authority public key certificate, to the root certification authority, and acquires the certification authority public key certificate transmitted from the root certification authority in response to the request, stores the certification authority public key certificate and the certification authority secret key, transmits the certification authority public key certificate that is stored to another terminal device, verifies the certification authority public key certificate, which is transmitted from the other terminal device, with a root certification authority public key certificate, and verifies a user of the other terminal device by using the certification authority public key certificate in a case where verification of the certification authority public key certificate succeeds. The root certification authority receives information that is transmitted from each of the plurality of terminal devices for making the request for the certification authority public key certificate, generates the certification authority public key certificate by encrypting the certification authority public key, which is received, with the root certification authority secret key that is stored in a root certification authority key storage unit that stores the root certification authority public key certificate and the root certification authority secret key, and transmits the certification authority public key certificate to a terminal device that makes a request for the certification authority public key certificate.

(8) According to still another aspect of the invention, a communication method that is executed by a terminal device is provided. The communication method includes: generating a certification authority public key and a certification authority secret key that forms a pair with the certification authority public key; transmitting information, to which the certification authority public key is attached and which makes a request for a certification authority public key certificate, to a root certification authority, and acquiring the certification authority public key certificate transmitted from the root certification authority in response to the request; storing the certification authority public key certificate, and the certification authority secret key; transmitting the certification authority public key certificate, which is stored, to another terminal device; and verifying the certification authority public key certificate, which is transmitted from the other terminal device, with a root certification authority public key certificate, and verifying a user of the other terminal device by using the certification authority public key certificate in a case where verification of the certification authority public key certificate succeeds.

(9) According to still another aspect of the invention, a computer program is provided that allows a computer of a terminal device to execute processes, the processes comprising: generating a certification authority public key and a certification authority secret key that forms a pair with the certification authority public key; transmitting information, to which the certification authority public key is attached and which makes a request for a certification authority public key certificate, to a root certification authority, and acquiring the certification authority public key certificate transmitted from the root certification authority in response to the request; storing the certification authority public key certificate, and the certification authority secret key; transmitting the certification authority public key certificate, which is stored, to another terminal device; and verifying the certification authority public key certificate, which is transmitted from the other terminal device, with a root certification authority public key certificate, and verifying a user of the other terminal device by using the certification authority public key certificate in a case where verification of the certification authority public key certificate succeeds.

Advantageous Effects of Invention

According to the invention, even in a case where a certification authority public key certificate managed by an arbitrary SE is leaked, it is possible to reduce an influence on an SE to which the certification authority public key certificate is transmitted.

DESCRIPTION OF EMBODIMENTS

Figure 1:
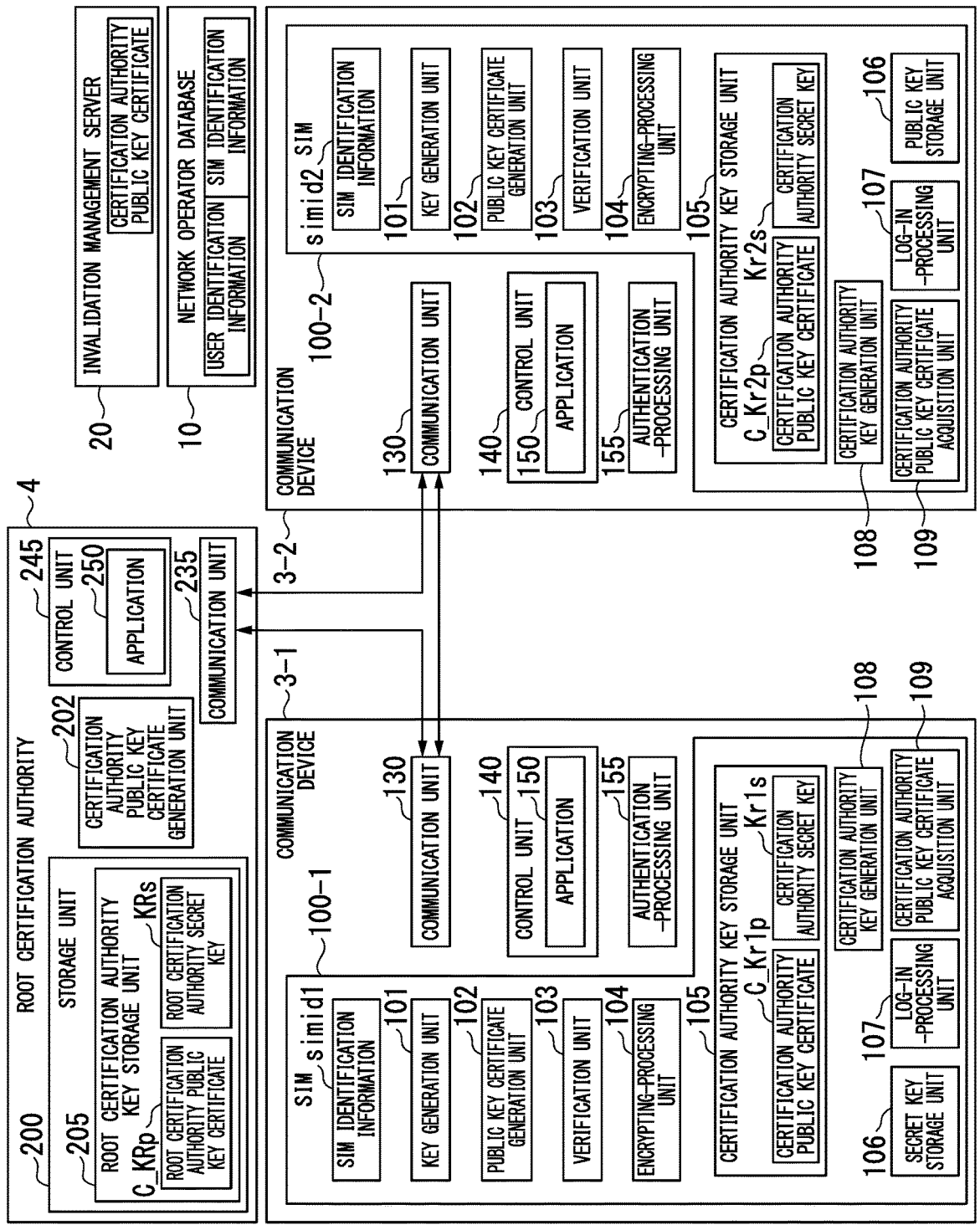
FIG. 1 is a configuration diagram illustrating a communication system according to an embodiment.

Next, an embodiment for carrying out the invention will be described with reference to the accompanying drawings. The following embodiment is illustrative only, and embodiments to which the invention is applied are not limited to the following embodiment.

Furthermore, in the entirety of drawings which illustrate the embodiment, the same reference numerals will be given to components having the same function, and redundant description will be omitted.

First Embodiment

FIG. 1 is a configuration diagram illustrating a communication system 1 according to a first embodiment. In FIG. 1, the communication system 1 includes a communication device 3-1, and a communication device 3-2. The communication device 3-1 includes a subscriber identity module (SIM) 100-1, a communication unit 130, a control unit 140, and an authentication-processing unit 155. The SIM 100-1 stores SIM identification information simid1. The SIM identification information simid1 is identification information unique to the SIM 100-1. The SIM 100-1 includes a key generation unit 101, a public key certificate generation unit 102, a verification unit 103, an encrypting-processing unit 104, a certification authority key storage unit 105, a secret key storage unit 106, a log-in-processing unit 107, a certification authority key generation unit 108, and a certification authority public key certificate acquisition unit 109.

The communication device 3-2 has the same configuration as the communication device 3-1. In the communication device 3-2 illustrated in FIG. 1, the same reference numerals are given to portions corresponding to respective units of the communication device 3-1. In the following description, when the communication device 3-1 and the communication device 3-2 are not particularly distinguished, they will be referred to as "communication device 3". Furthermore, one communication device 3 may include a plurality of the SIMs. For example, the communication device 3 may be a communication device that includes a plurality of SIM slots, and is capable of changing a connection destination with an arbitrary communication network among communication networks corresponding to SIMs inserted in the respective SIM slots.

The communication device 3-2 includes an SIM 100-2. The SIM 100-2 stores SIM identification information sim2. The SIM identification information simid2 is identification information unique to the SIM 100-2.

The SIM 100-1 is an SIM that is issued to a user who is authenticated by a network operator.

The SIM identification information simid1 of the SIM 100-1 is stored in a network operator database 10 in association with user identification information of a user who is authenticated by the network operator. As in the SIM 100-1, the SIM 100-2 is also an SIM that is issued to a user who is authenticated by the network operator. SIM identification information simid2 of the SIM 100-2 is stored in the network operator database 10 in association with user identification information of a user who is authenticated by the network operator. In the following description, when the SIM 100-1 and the SIM 100-2 are not particularly distinguished, they are referred to as "SIM 100". Furthermore, the SIM 100 may be an SIM that is issued to a user who is authenticated by a virtual network operator.

As the SIM identification information, for example, an international mobile subscriber identity (IMSI) or an integrated circuit card ID (ICCID) may be used. In addition, a telephone number associated with the SIM 100 may also be used as the SIM identification information of the SIM 100. In addition, the communication system 1 includes a root certification authority 4. The root certification authority 4 includes a storage unit 200, a communication unit 235, a certification authority public key certificate generation unit 202, and a control unit 245. The storage unit 200 includes a root certification authority key storage unit 205.

The communication unit 130 of the communication device 3-1, the communication unit 130 of the communication device 3-2, and the communication unit 235 of the root certification authority 4 perform communication with each other. Communication between the communication unit 130 of the communication device 3-1, the communication unit 130 of the communication device 3-2, and the communication unit 235 of the root certification authority 4 may be radio communication or wired communication. For example, the communication unit 130 of the communication device 3-1, the communication unit 130 of the communication device 3-2, and the communication unit 235 of the root certification authority 4 may perform communication through a radio communication network such as a wireless LAN and a cellular telephone network.

In addition, the communication unit 130 of the communication device 3-1, the communication unit 130 of the communication device 3-2, and the communication unit 235 of the root certification authority 4 may perform communication by directly transmitting and receiving a signal by near field communication. In addition, the communication unit 130 of the communication device 3-1, the communication unit 130 of the communication device 3-2, and the communication unit 235 of the root certification authority 4 may perform communication through a communication network such as the Internet or a fixed telephone network, and a wired LAN. In addition, the communication unit 130 of the communication device 3-1, the communication unit 130 of the communication device 3-2, and the communication unit 235 of the root certification authority 4 may be connected by a communication cable to perform communication.

In the communication device 3, the control unit 140 includes a central processing unit (CPU) and a memory, and controls respective units which are provided in the communication device 3. The control unit 140 includes an application 150 as a functional unit thereof. In addition, in the root certification authority 4, the control unit 245 includes a CPU and a memory, and controls respective units which are provided in the root certification authority 4. The control unit 245 includes an application 250 as a functional unit thereof.

The SIM 100 is a kind of a computer and realizes a desired function by a computer program. In the SIM 100, the certification authority key storage unit 105 stores a pair of a certification authority public key certificate C_Kr1$p$ and a certification authority secret key Kr1$s$. The certification authority public key certificate C_Kr1$p$ is a public key certificate of a certification authority public key that forms a pair with the certification authority secret key Kr1$s$. The certification authority public key certificate C_Kr1$p$ is acquired from the root certification authority 4 and is safely stored in the SIM 100 in combination with the certification authority secret key Kr1$s$. As in the certification authority public key certificate C_Kr1$p$ and the certification authority secret key Kr1$s$ which are stored in the SIM 100-1 of the communication device 3-1, a certification authority public key certificate C_Kr2$p$ and a certification authority secret key Kr2$s$ are stored in the SIM 100-2 of the communication device 3-2.

The certification authority key storage unit 105 is provided in a non-volatile storage region, to which access from the outside of the SIM 100 is prohibited, in a storage region in the SIM 100. Accordingly, the certification authority public key certificate C_Kr1$p$ and the certification authority secret key Kr1$s$, which are stored in the certification authority key storage unit 105, are not accessed from the outside of the SIM 100. In addition, the SIM 100 has tamper resistance. Accordingly, the certification authority public key certificate C_Kr1$p$ and the certification authority secret key Kr1$s$ which are stored in the certification authority key storage unit 105 are protected from attack with respect to the SIM 100.

In the storage unit 200, the root certification authority key storage unit 205 stores a pair of a root certification authority public key certificate C_KR$p$ and a root certification authority secret key KR$s$. The root certification authority public key certificate C_KR$p$ is a public key certificate of a root certification authority public key that forms a pair with the root certification authority secret key KR$s$. The root certification authority public key certificate C_KR$p$ and the root certification authority secret key KR$s$ are safely stored in the storage unit 200, for example, during manufacturing of the storage unit 200, and the like.

The root certification authority key storage unit 205 is provided in a non-volatile storage region, to which access from the outside of the storage unit 200 is prohibited, in a storage region in the storage unit 200. Accordingly, the root certification authority public key certificate C_KR$p$ and the root certification authority secret key KR$s$, which are stored in the root certification authority key storage unit 205, are not accessed from the outside of the storage unit 200.

The key generation unit 101 generates a pair of a public key and a secret key. The public key certificate generation unit 102 generates a public key certificate by using the pair of the certification authority public key certificate C_Kr1$p$ and the certification authority secret key Kr1$s$ which are stored in the certification authority key storage unit 105. The secret key storage unit 106 stores the secret key that forms a pair with the public key certificate generated by the public key certificate generation unit 102. As in the certification authority key storage unit 105, the secret key storage unit 106 is provided in a non-volatile storage region, to which access from the outside of the SIM 100 is prohibited, in a storage region in the SIM 100. Accordingly, the secret key stored in the secret key storage unit 106 is not accessed from the outside of the SIM 100. In addition, the SIM 100 has tamper resistance, and thus the secret key stored in the secret key storage unit 106 is protected from attack with respect to the SIM 100.

The verification unit 103 verifies the certification authority public key certificate C_Kr1$p$, which is acquired from data that is received from another communication device 3 by the communication unit 130 and includes a certification authority public key certificate C_Kr1$p$ of the other communication device 3 and a public key certificate of the other communication device 3, by using the root certification authority public key certificate C_KR$p$. The root certification authority public key certificate C_KR$p$ is acquired from the root certification authority 4 and is stored in the SIM 100 prior to verification processing. In a case where verification of the certification authority public key certificate C_Kr1$p$ succeeds, the verification unit 103 verifies the public key certificate by using the certification authority public key certificate C_Kr1$p$ for which verification succeeds. The encrypting-processing unit 104 executes encrypting processing of public key encrypting type by using a secret key stored in the secret key storage unit 106. The log-in-processing unit 107 performs processing of allowing a user of the communication device 3-1 to log in the communication device 3-2.

The certification authority key generation unit 108 generates a pair of a certification authority public key Kr1$p$ and the certification authority secret key Kr1$s$, and stores the certification authority secret key Kr1$s$ in the certification authority key storage unit 105. The certification authority public key certificate acquisition unit 109 makes a request for the root certification authority 4 to issue the certification authority public key certificate C_Kr1$p$, and acquires the certification authority public key certificate C_Kr1$p$ from the root certification authority 4. For example, the certification authority public key certificate acquisition unit 109 transmits a certification authority public key certificate-issuing request to which the certification authority public key Kr1$p$ generated by the certification authority key generation unit 108 is attached to the root certification authority 4. When receiving the certification authority public key certificate C_Kr1$p$ transmitted from the root certification authority 4, the certification authority public key certificate acquisition unit 109 stores the certification authority public key certificate C_Kr1$p$ in the certification authority key storage unit 105.

In the root certification authority 4, the certification authority public key certificate generation unit 202 generates the certification authority public key certificate C_Kr1$p$ by using the root certification authority secret key KR$s$ that is stored in the root certification authority key storage unit 205, and the certification authority public key Kr1$p$ that is transmitted by the communication device 3-1. The certification authority public key certificate generation unit 202 transmits the certification authority public key certificate C_Kr1$p$ that is generated from the communication unit 235 to the communication device 3-1. The certification authority public key certificate generation unit 202 may transmit the root certification authority public key certificate C_KR$p$ in combination with the certification authority public key certificate C_Kr1$p$.

In addition, the communication system 1 includes an invalidation management server 20. The certification authority public key certificate C_Kr1$p$ that is invalidated is stored in the invalidation management server 20.

Figure 2:
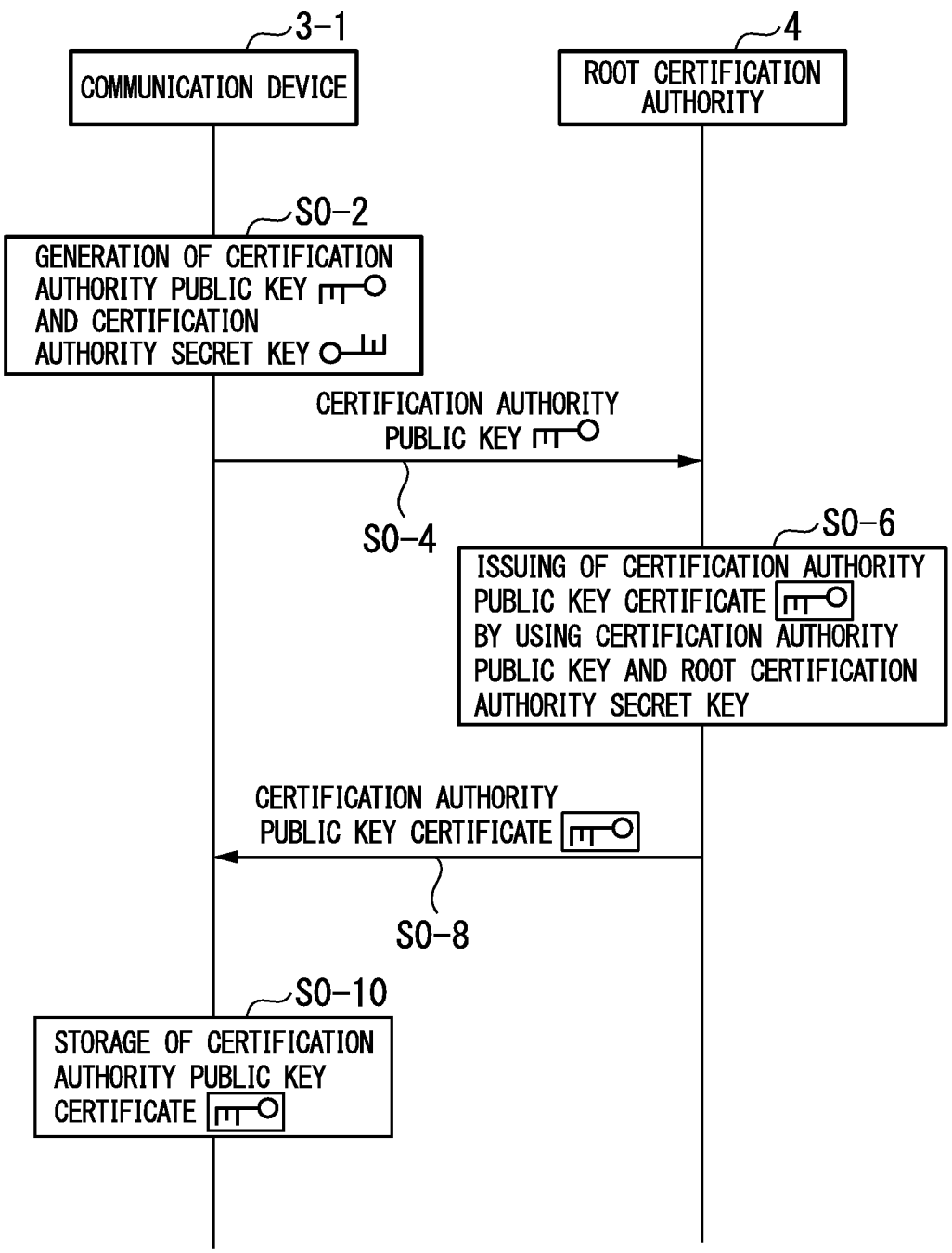
FIG. 2 is a sequence chart illustrating a communication method according to this embodiment.

Next, an operation of the communication system 1 illustrated in FIG. 1 will be described with reference to FIG. 2 and FIG. 3. FIG. 2 is a view illustrating a communication method related to this embodiment. FIG. 2 illustrates an operation of storing a certification authority public key certificate in the SIM 100-1 of the communication device 3-1.

(Step S0-2) In the communication device 3-1, a certification authority application allows the control unit 140 to function as the certification authority key generation unit 108 to generate the certification authority public key Kr1$p$ and the certification authority secret key Kr1$s$.

(Step S0-4) In the communication device 3-1, the certification authority application allows the control unit 140 to function as the certification authority public key certificate acquisition unit 109 to output the certification authority public key Kr1$p$ generated by the certification authority key generation unit 108 to the communication unit 130. The communication unit 130 transmits the certification authority public key Kr1$p$ to the root certification authority 4.

(Step S0-6) In the root certification authority 4, the root certification authority application allows the control unit 245 to function as the certification authority public key certificate generation unit 202 to issue the certification authority public key certificate C_Kr1$p$ by using the certification authority public key Kr1$p$ supplied from the communication device 3-1, and the root certification authority secret key KRs stored in the root certification authority key storage unit 205.

An electronic signature of the certification authority public key Kr1$p$ is encrypted data that is a result of encrypting a digest of data including the certification authority public key Kr1$p$ and the SIM identification information simid1 with the root certification authority secret key KRs. Here, as an example of the digest, a hash value is used. In addition, as an example of public key certificate format, "X.509" standard public key certificate format defined by international telecommunication union-telecommunication (ITU-T) and the like is used. The certification authority public key Kr1$p$ is stored at a predetermined position in the "X.509" standard public key certificate format. In addition, the SIM identification information simid1 is stored at a position of "subject parameter: subject person's name" in the "X.509" standard public key certificate format.

A method of generating the certification authority public key certificate C_Kr1$p$ in the storage unit 200 will be described in detail. In the storage unit 200, the certification authority public key certificate generation unit 202 calculates a hash value hash (Kr1$p$, simid1) of data in the "X.509" standard public key certificate format that stores the certification authority public key Kr1$p$ and the SIM identification information simid1. Then, the certification authority public key certificate generation unit 202 encrypts the hash value hash (kr1$p$, simid1) with the root certification authority secret key KRs that is stored in the root certification authority key storage unit 205 of the storage unit 200. The encrypted data KRs (hash (kr1$p$, simid1)) is an electronic signature of the certification authority public key Kr1$p$. Then, the certification authority public key certificate generation unit 202 constructs a certification authority public key certificate C_Kr1$p$ "Kr1$p$, simid1, KRs (hash (Kr1$p$, simid1))", which includes the certification authority public key Kr1$p$, the SIM identification information simid1, and the electronic signature KRs (hash (Kr1$p$, simid1)) of the certification authority public key Kr1$p$, in the "X.509" standard public key certificate format.

(Step S0-8) In the root certification authority 4, the communication unit 235 transmits certification authority public key certificate C_Kr1$p$, which is generated by the certification authority public key certificate generation unit 202, to the communication device 3-1.

(Step S0-10) In the communication device 3-1, the certification authority application allows the control unit 140 to function as the certification authority public key certificate acquisition unit 109 to store the certification authority public key certificate C_Kr1$p$, which is transmitted from the root certification authority 4, in the certification authority key storage unit 105.

Even in a case of storing the certification authority public key certificate in the SIM 100-2 of the communication device 3-2, the same operations as in step S0-2 to step S0-10 are performed.

Figure 3:
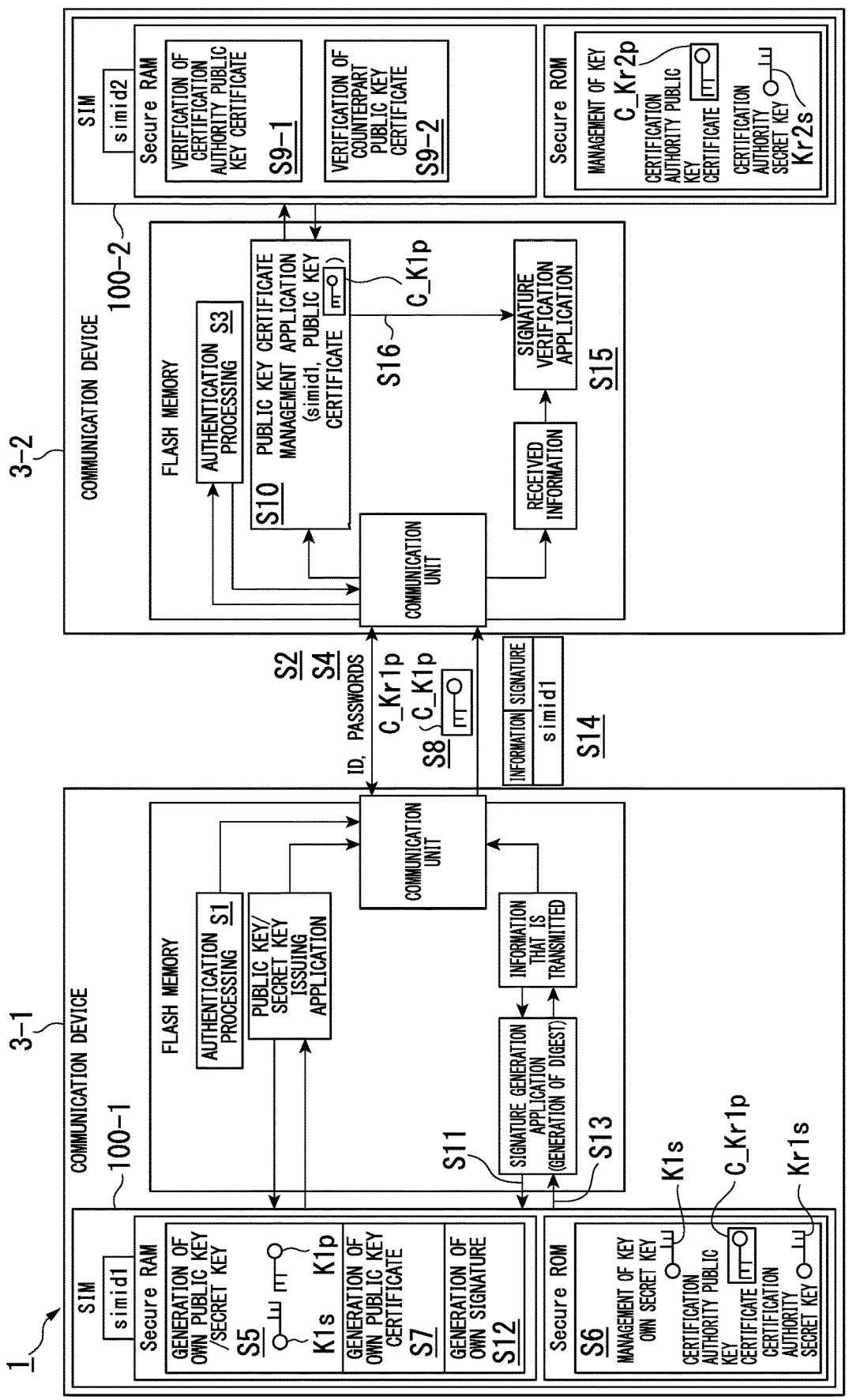
FIG. 3 is a view illustrating the communication method according to this embodiment.

FIG. 3 illustrates a case of transmitting information from the communication device 3-1 to the communication device 3-2. Here, description will be given with reference to the case of transmitting information from the communication device 3-1 to the communication device 3-2, but the description also applies to an opposite case in which information is transmitted from the communication device 3-2 to the communication device 3-1. Furthermore, the description also applies to a case where information is transmitted and received between the communication device 3-1 and other communication devices 3 other than the communication device 3-2. That is, the description also applies to a case where information is transmitted and received between a plurality of three or more communication devices 3.

The SIM 100-1 of the communication device 3-1 stores the certification authority public key certificate C_Kr1$p$ and the certification authority secret key Kr1$s$ in the certification authority key storage unit 105, and the SIM 100-2 of the communication device 3-2 stores a certification authority public key certificate C_Kr2$p$ and a certification authority secret key Kr2$s$ in the certification authority key storage unit 105. In FIG. 3, the certification authority public key certificate C_Kr1$p$ and the certification authority secret key Kr1$s$ are stored in a secure ROM in the SIM 100. In addition, the certification authority public key certificate C_Kr2$p$ and the certification authority secret key Kr2$s$ are stored in the secure ROM in the SIM 100. The secure ROM in the SIM 100 is a non-volatile region to which access from the outside of the SIM 100 is prohibited. In addition, the root certification authority public key certificate C_KR$p$ is also stored in the SIM 100.

The control unit 140 of the communication device 3-1 includes a log-in processing application, a public key/secret key issuing application, and a signature generation application as the application 150. Processing of the applications is performed in a flash memory in the control unit 140 of the communication device 3-1. The control unit 140 of the communication device 3-2 includes an authentication processing application, a public key certificate management application, and a signature verifying application as the application 150. Processing of these applications is performed in a flash memory in the control unit 140 of the communication device 3-2.

[Authentication Processing Sequence]

Steps S1 to S4 of the authentication processing sequence will be described.

(Step S1) In the communication device 3-1, the log-in processing application allows the control unit 140 to function as the authentication-processing unit 155 to instruct a user of the communication device 3-1 to input a user ID and passwords. In the communication device 3-1, the authentication-processing unit 155 acquires the user ID and the passwords which are input by the user, encrypts the user ID and the passwords, and input the encrypted user ID and passwords to the communication unit 130.

(Step S2) In the communication device 3-1, the communication unit 130 transmits the user ID and the passwords, which are input by the user and are encrypted, to the communication device 3-2.

(Step S3) In the communication device 3-2, the authentication processing application allows the control unit 140 to function as the authentication-processing unit 155 to decrypt the encrypted user ID and passwords which are transmitted from the communication device 3-1, and to authenticate a user on the basis of the decrypted user ID and passwords. In the communication device 3-2, the authentication-processing unit 155 inputs a user authentication result to the communication unit 130.

(Step S4) In the communication device 3-2, the communication unit 130 transmits the user authentication result to the communication device 3-1.

Hereinafter, description will be given of a case where authentication succeeds in the communication device 3-2. In a case where authentication fails, the authentication processing application allows the control unit 140 to function as the authentication-processing unit 155 to notify the user of failure of the authentication processing.

[Procedure from Issuing of Public Key Certificate to Transmission of Public Key Certificate]

In a case where the authentication processing succeeds, a procedure from issuing of the public key certificate to transmission of the public key certificate is executed. Steps S5 to S10 of the procedure from issuing of the public key certificate to transmission of the public key certificate will be described.

(Step S5) In the communication device 3-1, the public key/secret key issuing application (client application) instructs the SIM 100-1 to generate a pair of a public key and a secret key. The key generation unit 101 of the SIM 100-1 generates a public key K1$p$ and a secret key K1$s$ in response to the instruction. Generation of the public key K1$p$ and the secret key K1$s$ is performed in a secure RAM in the SIM 100-1. The secure RAM in the SIM 100-1 is a volatile storage region to which access from the outside of the SIM 100-1 is prohibited. Accordingly, processing performed in the secure RAM in the SIM 100-1 is concealed from the outside of the SIM 100-1.

(Step S6) In the SIM 100-1, the secret key storage unit 106 stores the secret key K1$s$ generated by the key generation unit 101. In FIG. 3, the secret key K1$s$ is stored in the secure ROM in the SIM 100-1.

(Step S7) In the SIM 100-1, the certification authority application allows the control unit 140 to function as the public key certificate generation unit 102 to generate a public key certificate C_K1$p$ of the public key K1$p$ generated by the key generation unit 101. Generation of the public key certificate C_K1$p$ is performed in the secure RAM in the SIM 100-1. The public key certificate C_K1$p$ includes the public key K1$p$, the SIM identification information simid1, and an electronic signature of the public key K1$p$.

The electronic signature of the public key K1$p$ is encrypted data that is a result of encrypting a digest of data including the public key K1$p$ and the SIM identification information simid1 with the certification authority secret key Kr1$s$. Here, as an example of the digest, a hash value is used. In addition, as an example of public key certificate format, "X.509" standard public key certificate format defined by international telecommunication union-telecommunication (ITU-T) and the like is used. The public key K1$p$ is stored at a predetermined position in the "X.509" standard public key certificate format. In addition, the SIM identification information simid1 is stored at a position of "subject parameter: subject person's name" in the "X.509" standard public key certificate format.

A method of generating the public key certificate C_K1$p$ in the SIM 100-1 will be described in detail. In the SIM 100-1, the public key certificate generation unit 102 calculates a hash value hash (K1$p$, simid1) of data in the "X.509" standard public key certificate format that stores the public key K1$p$ and the SIM identification information simid1. The public key certificate generation unit 102 encrypts the hash value hash (K1$p$, simid1) with the certification authority secret key Kr1$s$ stored in the certification authority key storage unit 105 of the SIM 100-1. The encrypted data Kr1$s$ (hash (K1$p$, simid1)) is an electronic signature of the public key K1$p$. Then, the public key certificate generation unit 102 constructs a public key certificate C_K1$p$ "K1$p$, simid1, Kr1$s$ (hash (K1$p$, simid1))", which includes the public key K1$p$, the SIM identification information simid1, and the electronic signature Kr1$s$ (hash (K1$p$, simid1)) of the public key K1$p$, in the "X.509" standard public key certificate format.

The SIM 100-1 transmits the certification authority public key certificate C_Kr1$p$ stored in the certification authority key storage unit 105, and the public key certificate C_K1$p$ "K1$p$, simid1, Kr1$s$ (hash (K1$p$, simid1))" generated by the public key certificate generation unit 102 to the public key/secret key issuing application.

(Step S8) In the communication device 3-1, the public key/secret key issuing application outputs the certification authority public key certificate C_Kr1$p$ and the public key certificate C_K1$p$ "K1$p$, simid1, Kr1$s$ (hash (K1$p$, simid1))" received from the SIM 100-1 to the communication unit 130. The communication unit 130 transmits the certification authority public key certificate C_Kr1$p$ and the public key certificate C_K1$p$ "K1$p$, simid1, Kr1$s$ (hash (K1$p$, simid1))" to the communication device 3-2.

In the communication device 3-2, the communication unit 130 receives the certification authority public key certificate C_Kr1$p$ and the public key certificate C_K1$p$ "K1$p$, simid1, Kr1$s$ (hash (K1$p$, simid1))" from the communication device 3-1. The communication unit 130 transmits the certification authority public key certificate C_Kr1$p$ and the public key certificate C_K1$p$ "K1$p$, simid1, Kr1$s$ (hash (K1$p$, simid1))" to the public key certificate management application.

(Step S9-1) In the communication device 3-2, the public key certificate management application transmits the certification authority public key certificate C_Kr1$p$ received from the communication device 3-1 to the SIM 100-2 and instructs the SIM 100-2 to verify the certification authority public key certificate C_Kr1$p$. In the SIM 100-2, the verification unit 103 verifies the signature of the certification authority public key certificate C_Kr1$p$ with the root certification authority public key certificate C_KRp. Verification of the certification authority public key certificate C_Kr1$p$ is performed in a secure RAM in the SIM 100-2. The secure RAM in the SIM 100-2 is a volatile storage region to which access from the outside of the SIM 100-2 is prohibited. Accordingly, processing that is performed in the secure RAM in the SIM 100-2 is concealed from the outside of the SIM 100-2.

A method of verifying the certification authority public key certificate C_Kr1$p$ in the SIM 100-2 will be described in detail. In the SIM 100-2, the verification unit 103 acquires the certification authority public key Kr1$p$ and the SIM identification information simid1 from the certification authority public key certificate C_Kr1$p$ "Kr1$p$, simid1, KRs (hash (Kr1$p$, simid1))", and generates verification data in which the certification authority public key Kr1$p$ and the SIM identification information simid1, which are acquired, are stored in the "X.509" standard public key certificate format. In the verification data, the certification authority public key Kr1$p$ is stored at a predetermined position in the "X.509" standard public key certificate format. In the verification data, the SIM identification information simid1 is stored at a position of "subject parameter: subject person's name" in the "X.509" standard public key certificate format.

Then, the verification unit 103 calculates a verification hash value hash' (Kr1$p$, simid1) that is a hash value of the verification data. Then, the verification unit 103 acquires an electronic signature KRs (hash (Kr1$p$, simid1)) from the certification authority public key certificate C_Kr1$p$ "Kr1$p$, simid1, KRs (hash (Kr1$p$, simid1))", and decrypts the acquired electronic signature KRs (hash (Kr1$p$, simid1)) with a root certification authority public key Krp of the root certification authority public key certificate C_KRp. Decrypted data "KRp•KRs (hash (Kr1$p$, simid1))" is obtained through the decrypting.

Then, the verification unit 103 determines whether or not the verification hash value hash' (Kr1$p$, simid1) and the decrypted data "KRp•KRs (hash (Kr1$p$, simid1))" match each other. From a result of the determination, in a case where matching is established, the certification authority public key certificate C_Kr1$p$ "Kr1$p$, simid1, KRs (hash (Kr1$p$, simid1))" is verified as passing, and in a case where matching is not established, the certification authority public key certificate C_Kr1$p$ "Kr1$p$, simid1, KRs (hash (Kr1$p$, simid1))" is verified as failing.

In a case where the verification result of the certification authority public key certificate C_Kr1$p$, which is given in notification from the SIM 100-2, is "failing", the public key certificate management application discards the certification authority public key certificate C_Kr1$p$. In addition, the public key certificate management application may execute predetermined error processing.

(Step S9-2) In the communication device 3-2, in a case where the certification authority public key certificate C_Kr1$p$ is verified as passing, the public key certificate management application transmits the public key certificate C_K1$p$ "K1$p$, simid1, Kr1$s$ (hash (K1$p$, simid1))", which is received from the communication device 3-1, to the SIM 100-2, and instructs the SIM 100-2 to verify the public key certificate C_K1$p$.

In the SIM 100-2, the verification unit 103 verifies validity of the public key certificate C_K1$p$ "K1$p$, simid1, Kr1$s$ (hash (K1$p$, simid1))" by using the certification authority public key certificate C_Kr1$p$. Verification of the public key certificate C_K1$p$ is performed in the secure RAM in the SIM 100-2. The secure RAM in the SIM 100-2 is a volatile storage region to which access from the outside of the SIM 100-2 is prohibited. Accordingly, processing in the secure RAM in the SIM 100-2 is concealed from the outside of the SIM 100-2.

A method of verifying the public key certificate C_K1$p$ in the SIM 100-2 will be described in detail. In the SIM 100-2, the verification unit 103 acquires the public key K1$p$ and the SIM identification information simid1 from the public key certificate C_K1$p$ "K1$p$, simid1, Kr1$s$ (hash (K1$p$, simid1))", and generates verification data in which the public key K1$p$ and the SIM identification information simid1, which are acquired, are stored in the "X.509" standard public key certificate format. In the verification data, the public key K1$p$ is stored at a predetermined position in the "X.509" standard public key certificate format. In the verification data, the SIM identification information simid1 is stored at a position of "subject parameter: subject person's name" in the "X.509" standard public key certificate format.

Then, the verification unit 103 calculates a verification hash value hash' (k1$p$, simid1) that is a hash value of the verification data. Then, the verification unit 103 acquires an electronic signature Kr1$s$ (hash (k1$p$, simid1)) from the public key certificate C_K1$p$ "K1$p$, simid1, Kr1$s$ (hash (K1$p$, simid1))", and decrypts the acquired electronic signature Kr1$s$ (hash (k1$p$, simid1)) with the certification authority public key Kr1$p$ of the certification authority public key certificate C_Kr1$p$. Decrypted data "Kr1$p$•Kr1$s$ (hash (K1$p$, simid1))" is obtained through the decrypting.

Then, the verification unit 103 determines whether or not the verification hash value hash' (K1$p$, simid1) and the decrypted data "Kr1$p$•Kr1$s$ (hash (K1$p$, simid1))" match each other. From a result of the determination, in a case where matching is established, the public key certificate C_K1$p$ "K1$p$, simid1, Kr1$s$ (hash (K1$p$, simid1))" is verified as passing, and in a case where matching is not established, the public key certificate C_K1$p$ "K1$p$, simid1, Kr1$s$ (hash (K1$p$, simid1))" is verified as failing.

In the communication device 3-2, the SIM 100-2 notifies the public key certificate management application of the verification result of the public key certificate C_K1$p$ "K1$p$, simid1, Kr1$s$ (hash (K1$p$, simid1))".

(Step S10) In the communication device 3-2, in a case where the verification result of the public key certificate C_K1$p$ "K1$p$, simid1, Kr1$s$ (hash (K1$p$, simid1))", which is given in notification from the SIM 100-2, is "passing", the public key certificate management application retains the public key certificate C_K1$p$ "K1$p$, simid1, Kr1$s$ (hash (K1$p$, simid1))". In retaining of the public key certificate C_K1$p$, the public key certificate management application acquires the SIM identification information simid1 stored at the position of the "subject parameter: subject person's name" of the public key certificate C_K1$p$ "K1$p$, simid1, Kr1$s$ (hash (K1$p$, simid1))", and stores the public key certificate C_K1$p$ "K1$p$, simid1, Kr1$s$ (hash (K1$p$, simid1))" in the flash memory in the control unit 140 of the communication device 3-2 in association with the SIM identification information simid1 that is acquired.

On the other hand, in a case where the verification result of the public key certificate C_K1$p$ "K1$p$, simid1, Kr1$s$ (hash (K1$p$, simid1))", which is given in notification from the SIM 100-2, is "failing", the public key certificate management application discards the public key certificate C_K1$p$ "K1$p$, simid1, Kr1$s$ (hash (K1$p$, simid1))". In addition, the public key certificate management application may execute predetermined error processing.

[Information Transmission Sequence]

Next, steps S11 to S16 in the information transmission sequence will be described.

(Step S11) In the communication device 3-1, the signature generation application calculates a digest of information that is transmitted to the communication device 3-2. Here, as an example of the digest, a hash value is used. The signature generation application transmits the calculated hash value hash (information) to the SIM 100-1, and instructs the SIM 100-1 to generate a signature.

(Step S12) The encrypting-processing unit 104 of the SIM 100-1 calculates a hash value hash (hash (information), simid1) of data including the hash value hash (information) received from the signature generation application, and the SIM identification information simid1. In addition, the encrypting-processing unit 104 encrypts the calculated hash value hash (hash (information), simid1) with a secret key K1s stored in the secret key storage unit 106 of the SIM 100-1.

The encrypted data K1s (hash (hash (information), simid1)) is an electronic signature of information that is transmitted to the communication device 3-2. Generation of the electronic signature K1s (hash (hash (information), simid1)) is performed in the secure RAM in the SIM 100-1.

(Step S13) The SIM 100-1 transmits the electronic signature K1s (hash (hash (information), simid1)) generated by the encrypting-processing unit 104 to the signature generation application.

(Step S14) In the communication device 3-1, the signature generation application outputs the electronic signature K1s (hash (hash (information), simid1)), which is received from the SIM 100-1, to the communication unit 130. The communication unit 130 transmits the electronic signature K1s (hash (hash (information), simid1)), information that is transmitted to the communication device 3-2, and the SIM identification information simid1 to the communication device 3-2.

In the communication device 3-2, the communication unit 130 receives the electronic signature K1s (hash (hash (information), simid1)), the information, and the SIM identification information simid1 from the communication device 3-1. The communication unit 130 transmits the received electronic signature K1s (hash (hash (information), simid1)), the information, and the SIM identification information simid1 to the signature verification application.

(Step S15) In the communication device 3-2, the signature verification application calculates a verification hash value hash' (information) that is a hash value of the information received from the communication device 3-1. In addition, the signature verification application calculates a verification hash value hash' (hash' (information), simid1) that is a hash value of data that includes the verification hash value hash' (information) and the SIM identification information simid1 received from the communication device 3-1.

(Step S16) In the communication device 3-2, the signature verification application notifies the public key certificate management application of the SIM identification information simid1 received from the communication device 3-1 to make a request for the public key certificate. The public key certificate management application transmits the public key certificate C_K1p "K1p, simid1, Kr1s (hash (K1p, simid1))" retained in association with the SIM identification information simid1, which is given in notification from the signature verification application, to the signature verification application. The signature verification application acquires the public key k1p from the public key certificate C_K1p "K1p, simid1, Kr1s (hash (K1p, simid1))" received from the public key certificate management application. The signature verification application decrypts the electronic signature K1s (hash (hash (information), simid1)) received from the communication device 3-1 with the public key k1p that is acquired. Decrypted data "K1p•K1s (hash (hash (information), simid1))" is obtained through the decrypting. The signature verification application determines whether or not the verification hash value hash' (hash' (information), simid1) and the decrypted data "K1p•K1s (hash (hash (information), simid1))" match each other.

From a result of the determination, in a case where matching is established, verification of validity with respect to information received from the communication device 3-1 is "passing". On the other hand, matching is not established, verification of validity with respect to the information received from the communication device 3-1 is "failing". In a case of the failing, the signature verification application discards the information received from the communication device 3-1. In addition, the signature verification application may perform predetermined error processing. For example, the signature verification application may give a notification indicating that "the information received from the communication device 3-1 is altered" or "an information transmission side is unauthorized (impersonation and the like).

According to this embodiment, an operator who provides a service and a product construct a private root certification authority. A public key certificate of a root certification authority and a secret key of the root certification authority are stored in the root certification authority. In addition, each of a plurality of certification authorities, for which the public key certificate of the root certification authority, and a public key certificate of the certification authorities are issued from the root certification authority, stores an application including a public key certificate of an individual certification authority and a secret key of the individual certification authority in a safe region of an SE of an SIM that is issued by the operator. Here, the private root certification authority represents a certification authority that becomes the base when authentication is performed only for a service and a product of an arbitrary operator differently from a root certification authority on the Internet. According to this, even in a case where the SE of an arbitrary certification authority is analyzed and the public key certificate of the certification authority, which is stored in the SE, is leaked, the leaked public key certificate of the certification authority or a client public key certificate that is issued from the public key certificate of the certification authority is invalidated, and thus it is possible to reduce an influence on other certification authorities.

In this embodiment, the SIM 100 included in the communication device 3 is an SIM for which user authentication is completed by a network operator. This means that the communication device 3 becomes the basis of reliability as a certification authority.

Furthermore, a person who operates the communication device 3 and the communication device 3 may be bound to each other (associated with each other). For example, storage authentication in which predetermined passwords are input is added with respect to an operation or information that is desired to authenticate. Specifically, for example, when the communication device 3 generates the public key or the public key certificate, a person who operates the communication device 3 may be allowed to input predetermined passwords. In addition, when an electronic signature is attached with a secret key in the SIM 100 of the communication device 3, the person who operates the communication device 3 may be allowed to input predetermined passwords.

In addition, under a condition in which approval of an owner of the communication device 3 is obtained, electronic signature may be performed by describing an operation history (information related to a position in operation, an application execution history, and the like) of the communication device 3 in a form of the public key certificate or an attribute certificate that is associated with the public key certificate.

In addition, under a condition in which approval of the owner of the communication device 3 is obtained, the electronic signature may be performed by describing information of the owner, which is provided to a network operator, in the form of the public key certificate or the attribute certificate that is associated with the public key certificate.

In addition, the SIM is a general term of a secure element (SE) such as a communication module that stores unique identification information associated with user identification information, and is not limited to a communication module that is used in a specific communication system type. For example, a user identity module (UIM), a universal subscriber identity module (USIM), an embedded subscriber identity module (eSIM), and the like may be used.

In addition, in the embodiment, description has been given of a case where the authentication-processing unit 155 of the communication device 3-2 authenticates a user of the communication device 3-1 on the basis of a user ID and passwords which are input by the user of the communication device 3-1, but there is no limitation to the example. For example, one-time passwords may be applied. Specifically, in a case where a time stamp method is applied, a password generator called a token is generated in advance on the communication device 3-1 side. As a type of the token, various types such as an IC card type, a USB type, a key holder type, and a software type that is used after being installed exist, and all of the types are applicable. In the token, for example, a digit string is displayed, and the digit string is changed to other digits after passage of time. The digit string is used as the passwords.

When being authenticated, the user of the communication device 3-1 inputs the digit string that is displayed on the token as passwords in combination with identification information such as the user ID, and transmits the passwords to the communication device 3-2.

The communication device 3-2 knows a user who uses a token, and a configuration in which the token displays what digits at what time. The communication device 3-2 verifies an access time of the communication device 3-1, and passwords and identification numbers which are transmitted from the communication device 3-1 to authenticate whether or not an access source is a normal user.

In a case where the one-time passwords are applied, when authentication by the user ID and the passwords succeeds, the authentication-processing unit 155 of the communication device 3-2 issues a token that is valid for a predetermined period, and the token may be transmitted from the communication unit 130 to the communication device 3-1. In addition, the communication device 3-1 that received the token may execute the public key/secret key issuing application and the signature generation application without executing the log-in processing application for a predetermined period.

In addition, in a case where authentication by the user ID and the passwords fails, the authentication-processing unit 155 of the communication device 3-2 may notify the communication device 3-1 of failure of the authentication to notify the user of the communication device 3-1 of the authentication failure. In addition, in a case where verification of the user fails, the verification unit 103 of the communication device 3-2 may notify a service provider or a manager of the verification failure.

Furthermore, the communication device 3 as the transmission side of the public key certificate may not be provided with a function of verifying the public key certificate and a function of storing the public key certificate. Specifically, the communication device 3 that is a transmission side of the public key certificate may not be provided with the verification unit 103 and the public key certificate management application.

In addition, the communication device 3 as the reception side of the public key certificate may not be provided with a function of generating the public key certificate. Specifically, the communication device 3 as the reception side of the public key certificate may not be provided with the public key certificate generation unit 102 and the secret key storage unit 106.

In addition, the SIM 100 may store a pair of the public key and the secret key in advance. For example, the pair of the public key and the secret key may be stored in the SIM 100 during manufacturing of the SIM 100. In a case where the SIM 100 stores the pair of the public key and the secret key, the SIM 100 may not be provided with the key generation unit 101.

In addition, in the SIM 100, a plurality of pairs of the public key (public key certificate) and the secret key may be generated or stored. In this case, for example, the communication device 3 may use the plurality of pairs of the public key (public key certificate) and the secret key in accordance with a communication counterpart. In addition, in a case where an arbitrary pair of the public key (public key certificate) and the secret key is leaked, the communication device 3 may switch the pair to another pair.

Furthermore, user identification information associated with the SIM identification information may be included in the public key certificate. In a case where the user identification information is included in the public key certificate, the SIM identification information may not be included in the public key certificate. In addition, in a case where the user identification information is included in the public key certificate, the public key certificate management unit may store the public key certificate in association with the user identification information.

In addition, the user identification information that is associated with the SIM identification information may be included in an electronic signature of information that is transmitted. In this case, when transmitting the information, the user identification information and the electronic signature are transmitted in combination with each other.

Second Embodiment

Figure 4:
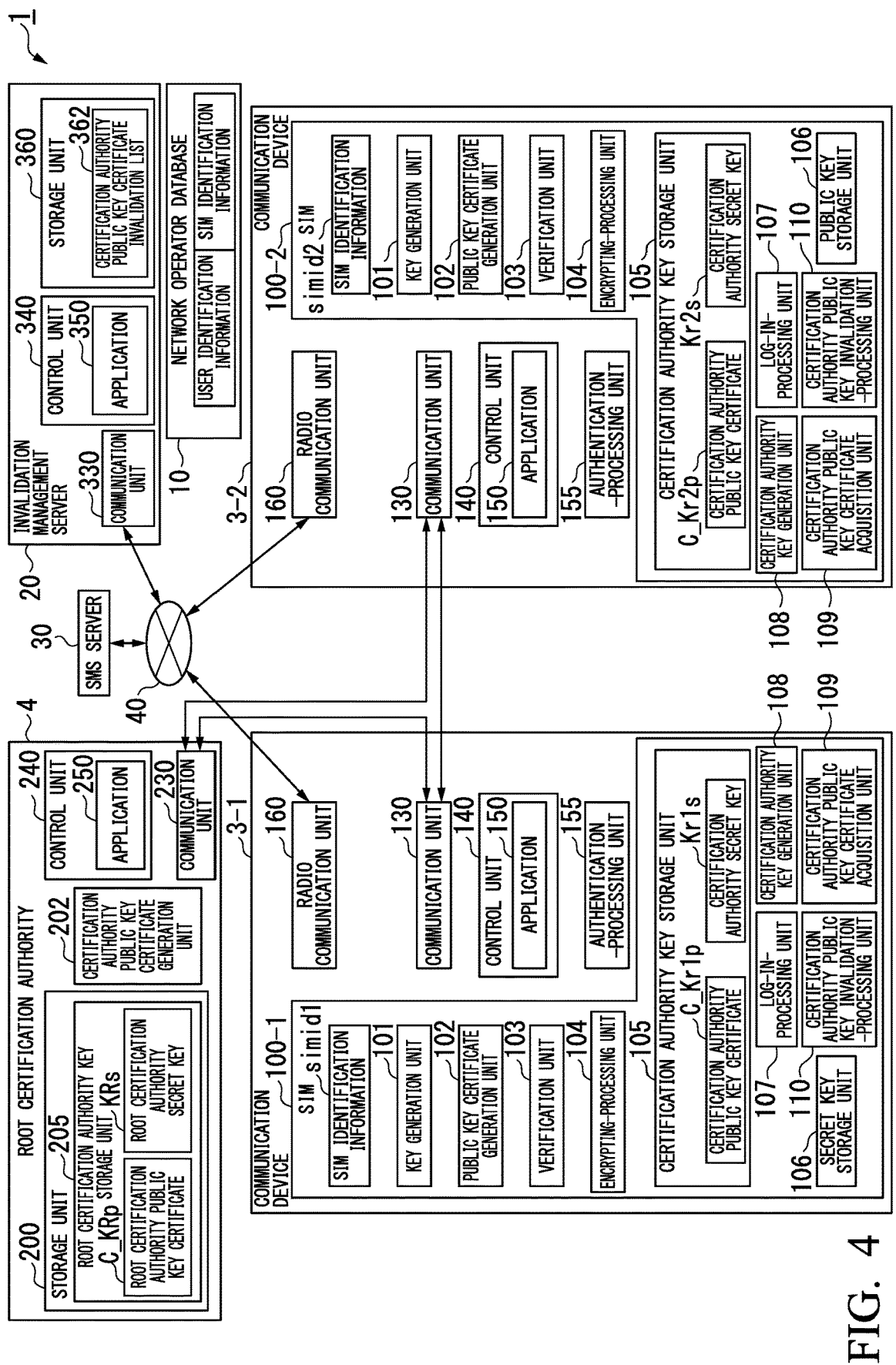
FIG. 4 is a configuration diagram illustrating the communication system according to this embodiment.

A second embodiment is a modification example of the above-described first embodiment. In the second embodiment, in a case where the SE of an arbitrary certification authority is analyzed, and the certification authority public key certificate stored in the SE is leaked, the public key certificate of the certification authority is invalidated. FIG. 4 is a configuration diagram illustrating a communication system 1 according to the second embodiment. In FIG. 4, the same reference numerals will be given to portions corresponding to the respective units in FIG. 1, and description thereof will be omitted. A communication device 3 according to the second embodiment illustrated in FIG. 4 further includes a radio communication unit 160 and a certification authority public key invalidation-processing unit 110 in comparison to the communication device 3 according to the first embodiment illustrated in FIG. 1. The certification authority public key invalidation-processing unit 110 is included in the SIM 100. In addition, an SMS server 30 that provides a short message service (SMS) is connected to a communication network 40. Hereinafter, a difference from the above-described first embodiment will be mainly described.

An invalidation management server 20 includes a communication unit 330, a control unit 340, and a storage unit 360.

The communication unit 330 performs communication through the communication network 40. The control unit 340 includes a CPU and a memory, and controls respective units which are provided in the invalidation management server 20. The control unit 340 includes an application 350 as a functional unit thereof. The storage unit 360 includes a non-volatile memory such as a flash memory, a hard disk drive (HDD), a solid state drive (SSD), and a secure digital (SD) card, and stores a certification authority public key certificate invalidation list 362. The communication unit 330 communicates with the communication device 3 and the SMS server 30 through the communication network 40.

In the communication device 3, the radio communication unit 160 performs communication through the communication network 40 to which the radio communication unit 160 is connected by using the SIM 100. The SIM 100 stores information related to usage of the communication network 40. The radio communication unit 160 can use the communication network 40 by using the SIM 100. The radio communication unit 160 is connected to the communication network 40 by a radio communication line that is established by using the SIM 100.

The certification authority public key invalidation-processing unit 110 accesses the invalidation management server 20 to acquire the certification authority public key certificate invalidation list 362, and confirms whether or not a certification authority public key certificate transmitted from a communication counterpart is invalidated. For example, the certification authority public key invalidation-processing unit 110 periodically accesses the invalidation management server 20 at a timing at which the communication device 3 exchanges the public key certificate, when the communication device 3 initiates communication with a communication counterpart, once a day, once a week, or the like to acquire the certification authority public key certificate invalidation list 362, and confirms whether or not the certification authority public key certificate transmitted from the communication counterpart is invalidated. In a case where the certification authority public key invalidation-processing unit 110 determines that the certification authority public key certificate is invalided, the control unit 140 performs control so that communication with the communication counterpart is not performed.

For example, the certification authority public key certificate invalidation list 362 may be over-the-air (OTA)-transmitted from the invalidation management server 20 to the communication device 3.

In addition, for example, the invalidation management server 20 may make a request for the SMS server 30 to allow the communication device 3 to acquire the certification authority public key certificate invalidation list 362. In addition, the SMS server 30 transmits a signal to the communication device 3 to make a request for the communication device 3 to acquire the certification authority public key certificate invalidation list 362. The certification authority public key invalidation-processing unit 110 may access the invalidation management server 20 according to the request signal to acquire the certification authority public key certificate invalidation list 362. In this case, the invalidation management server 20 retains a telephone number of the communication device 3. When the certification authority public key certificate invalidation list 362 is acquired by the SMS server 30, on the communication device 3 side, processing can be completed at the inside of the SIM 100, and thus it is possible to improve security.

According to this embodiment, even in a case where the SE of an arbitrary certification authority is analyzed, and the certification authority public key certificate stored in the SE is leaked, the invalidation management server 20 can manage the certification authority public key certificate that is leaked. According to this, each certification authority acquires a list of the invalidated certification authority public key certificate that is managed by the invalidation management server 20, and in a case where a certification authority public key certificate transmitted from a communication counterpart is invalidated, the certification authority may not establish communication. According to this, it is possible to reduce an influence on other certification authorities.

Third Embodiment

A third embodiment is a modification example of the above-described first embodiment, and the communication system 1 includes a hardware security module (HSM).

The HSM includes an SIM, generates a certification authority key including certification authority public key and a certification authority secret key at the inside of the SIM, and encrypts the certification authority public key with a secret key of a root certification authority to create a certification authority public key certificate. The HSM writes the certification authority public key certificate and the certification authority secret key in the SIM. The SIM in which the certification authority public key certificate and the certification authority secret key are written is mounted on the communication device 3.

Figure 5:
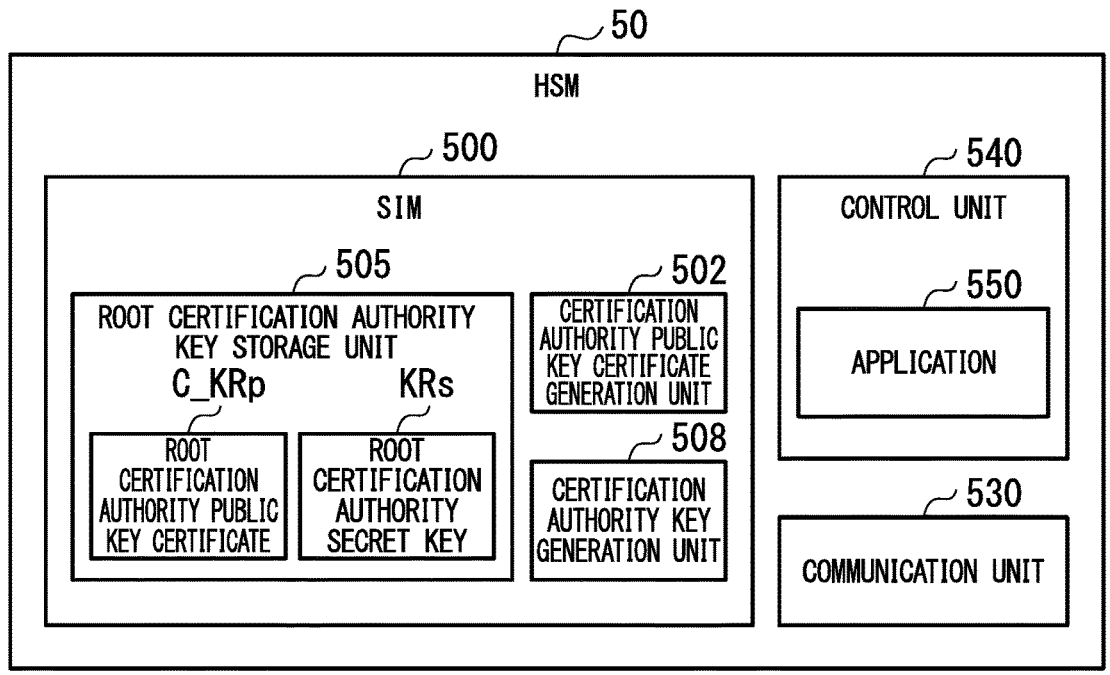
FIG. 5 is a configuration diagram illustrating a hardware security module according to this embodiment.

FIG. 5 is illustrates an example of an HSM 50. The HSM 50 includes an SIM 500, a communication unit 530, and a control unit 540. The SIM 500 includes a certification authority public key certificate generation unit 502, a certification authority key generation unit 508, and a root certification authority key storage unit 505.

The communication unit 530 is an interface with the SIM 500, and outputs a certification authority public key certificate and a certification authority secret key to the SIM 500. The certification authority public key certificate and the certification authority secret key, which are output, are stored in the SIM 500.

The certification authority key generation unit 508 generates a pair of a certification authority public key $Kr1p$ and a certification authority secret key $Kr1s$, and outputs the certification authority public key $Kr1p$ to the certification authority public key certificate generation unit 502. The certification authority public key certificate generation unit 502 generates a certification authority public key certificate $C\_Kr1p$ by using a root certification authority secret key $KRs$ stored in the root certification authority key storage unit 505, and the certification authority public key $Kr1p$ supplied by the certification authority key generation unit 508. The certification authority public key certificate generation unit 502 outputs the certification authority public key certificate C_Kr1p that is generated, and the certification authority secret key Kr1s to the communication unit 530.

The root certification authority key storage unit 505 stores a pair of a root certification authority public key certificate C_KRp, and the root certification authority secret key KRs. The root certification authority public key certificate C_KRp is a public key certificate of the root certification authority public key that forms a pair with the root certification authority secret key KRs. The root certification authority public key certificate C_KRp and the root certification authority secret key KRs are safely stored, for example, in the SIM 500 when manufacturing the SIM 500, and the like.

[Operation of HSM]

Figure 6:
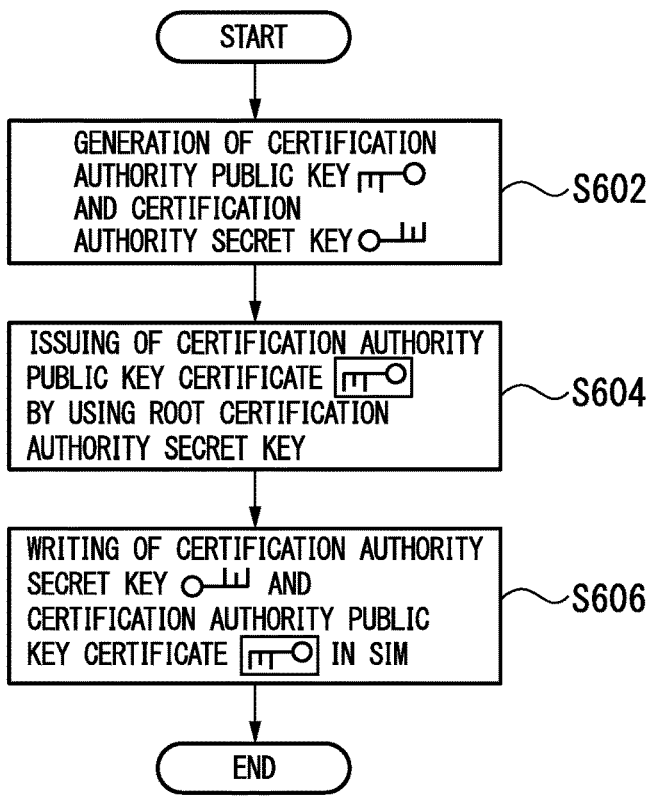
FIG. 6 is a flowchart illustrating an operation of the hardware security module according to this embodiment.

FIG. 6 illustrates an example of an operation of the HSM 50.

(Step S602) In the HSM 50, the HSM application allows the control unit 540 to function as the certification authority key generation unit 508 to generate the certification authority public key Kr1p and the certification authority secret key Kr1s.

(Step S604) In the HSM 50, the HSM application allows the control unit 540 to function as the certification authority public key certificate generation unit 502 to issue the certification authority public key certificate C_Kr1p by using the certification authority public key Kr1p and the root certification authority secret key KRs stored in the root certification authority key storage unit 505.

(Step S606) In the HSM 50, the HSM application allows the control unit 540 to function as the communication unit 530 to write the certification authority secret key Kr1s and the certification authority public key certificate C_Kr1p in the SIM 500.

According to this embodiment, in comparison to a case where the certification authority public key Kr1p and the certification authority secret key Kr1s are generated on the communication device 3 side, it is possible to omit processing of transmitting the certification authority public key Kr1p from the communication device 3, and thus it is possible to realize speeding-up of processing of writing the certification authority secret key Kr1s and the certification authority public key certificate C_Kr1p in the SIM 500.

Fourth Embodiment

Figure 7:
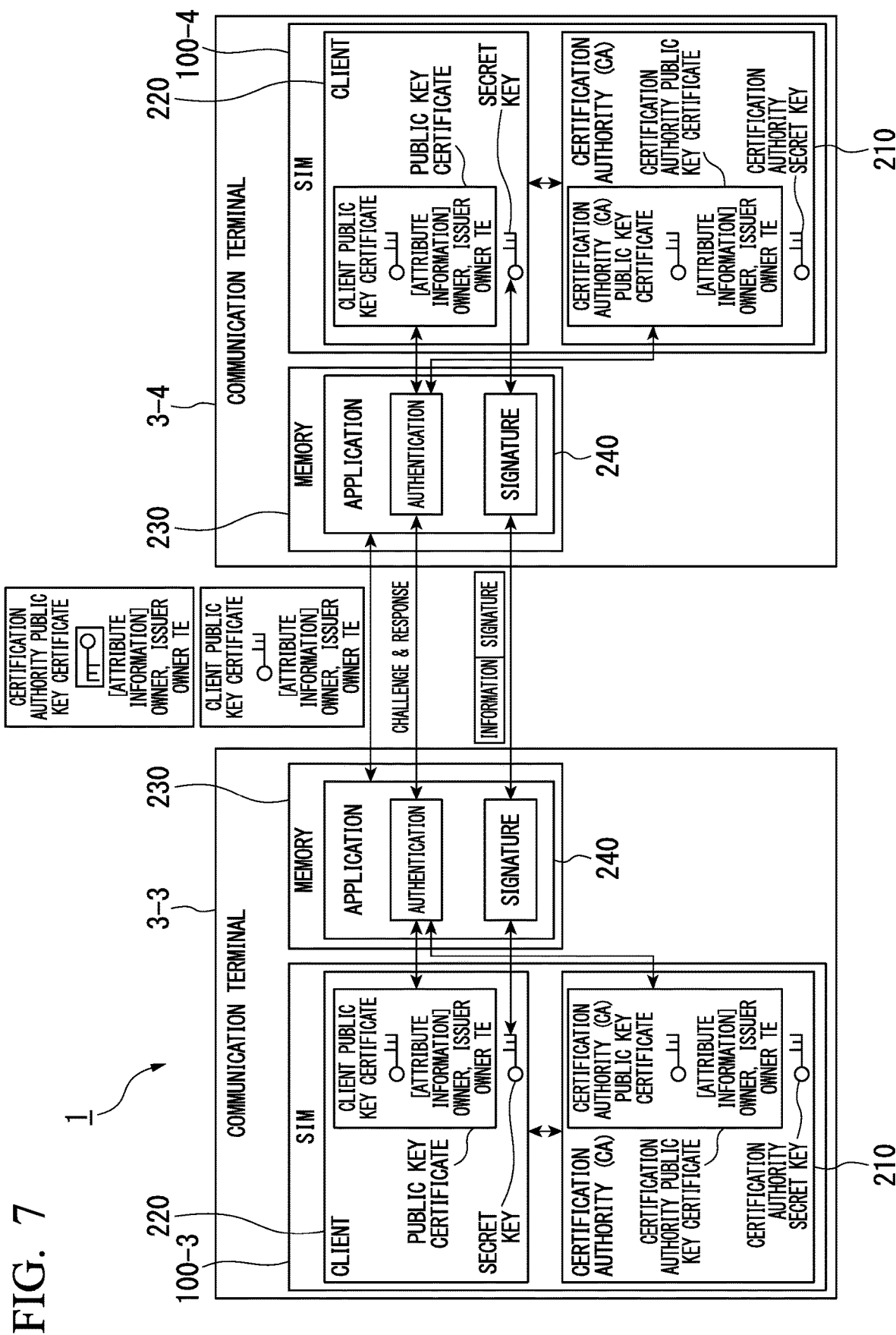
FIG. 7 is a configuration diagram illustrating the communication system according to this embodiment.

A fourth embodiment is an application example of the above-described first to third embodiments. FIG. 7 is a configuration diagram illustrating a communication system 1 according to the fourth embodiment. The communication system 1 illustrated in FIG. 7 includes a communication terminal 3-3 and a communication terminal 3-4. The communication terminal 3-3 and the communication terminal 3-4 have the same configuration as in the communication device 3 according to the first embodiment or the second embodiment. For example, the communication terminal 3-3 and the communication terminal 3-4 may be a portable communication terminal device such as a smartphone and a tablet-type personal computer (tablet PC), or a stand-alone type communication terminal device (for example, a stand-alone type computer or server computer, a home gateway, and the like).

The communication terminal 3-3 includes an SIM 100-3. The communication terminal 3-4 includes an SIM 100-4. The SIM 100-3 and the SIM 100-4 have the same configuration as in the SIM 100 according to the first embodiment or the second embodiment. According to this, the SIM 100-3 and the SIM 100-4 includes a certification authority (CA) 210 as a functional unit thereof. Accordingly, the communication terminal 3-3 and the communication terminal 3-4 function as the certification authority (CA). The certification authority 210 of the SIM 100-3 includes a pair of a certification authority public key certificate issued by the root certification authority 4, and a certification authority secret key. The SIM 100-4 includes a pair of a certification authority public key certificate issued by the root certification authority 4, and a certification authority secret key.

The SIM 100-3 and the SIM 100-4 includes a client 220 as a functional unit thereof. In the SIM 100-3, the client 220 transmits a public key thereof to the certification authority 210 to generate a public key certificate (client public key certificate) of the public key. Similarly, in the SIM 100-4, the client 220 transmits a public key thereof to the certification authority 210 to generate a public key certificate (client public key certificate) of the public key.

The communication terminal 3-3 and the communication terminal 3-4 include an application 240. Processing of the application 240 is performed in a memory 230 in a host communication terminal. The application 240 performs authentication processing and signature processing.

As illustrated in FIG. 7, in the communication system 1 according to the fourth embodiment, the communication terminal 3-3 and the communication terminal 3-4 transmit the own certification authority public key certificate and the own client public key certificate to communication counterparts. Each of the communication terminal 3-3 and the communication terminal 3-4 verifies validity of a received signature of the own certification authority public key certificate with the root certification authority public key certificate. In a case where validity of the signature of the certification authority public key certificate can be verified, the communication terminal 3-3 and the communication terminal 3-4 verify validity of a received signature of a client public key certificate with the certification authority public key certificate capable of being verified. The communication terminal 3-3 and the communication terminal 3-4 use the client public key certificate of a communication counterpart after verifying validity with the certification authority public key certificate in which validity of the signature can be verified. The client public key certificate is used in mutual authentication between communication terminals, an electronic signature of information that is exchanged between communication terminals, and the like. As a mutual authentication method, for example, a challenge and response authentication method can be exemplified.

Next, examples related to the fourth embodiment will be described.

Example 1

Figure 8:
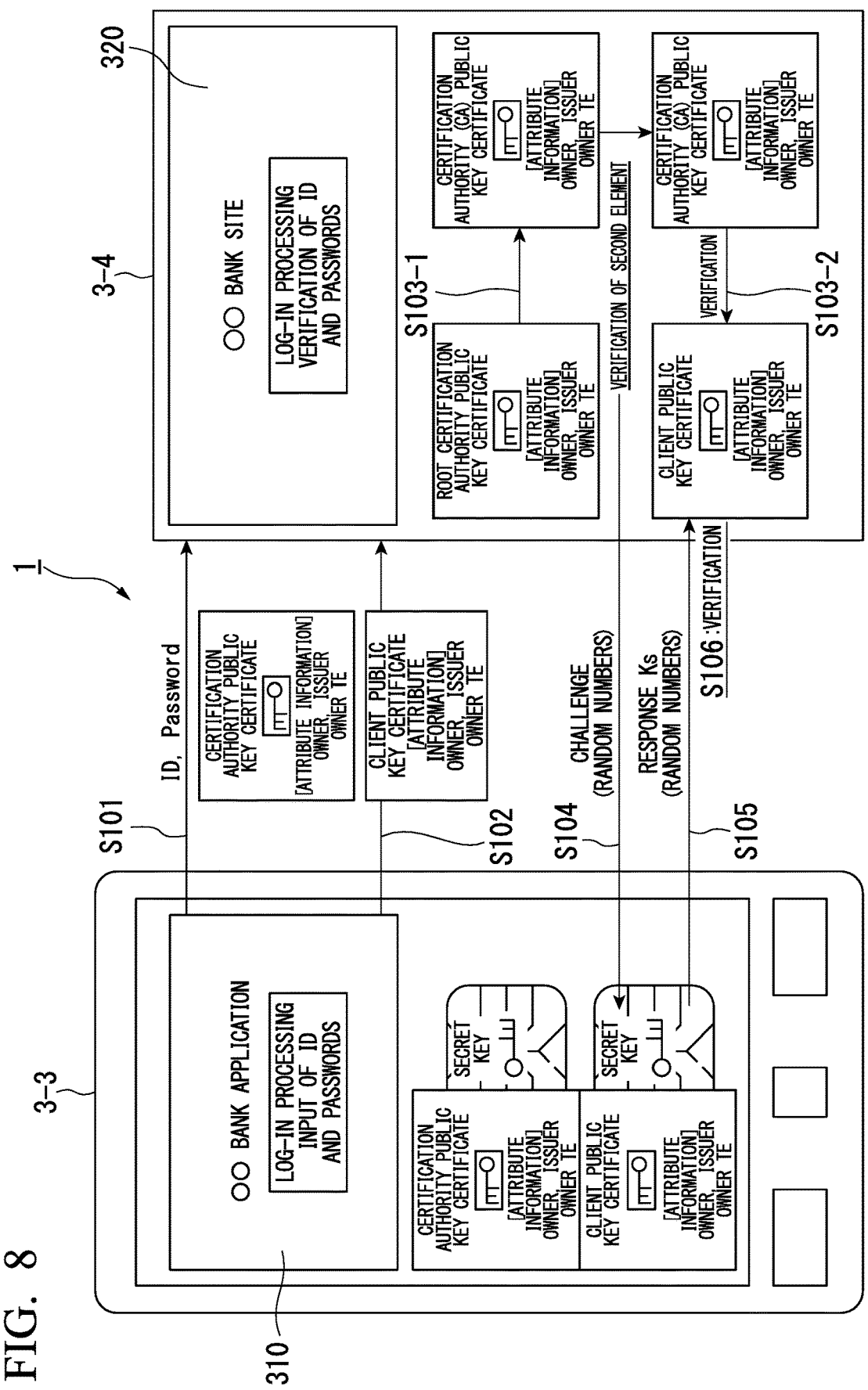
FIG. 8 is a view illustrating an operation of the communication system according to an example.

Example 1 related to the fourth embodiment will be described with reference to FIG. 8. FIG. 8 is a view illustrating a communication system 1 according to Example 1 of the fourth embodiment. The communication system 1 illustrated in FIG. 8 is applied to an on-line banking service system. In FIG. 8, the communication terminal 3-3 includes an application 310 of the on-line banking service system. The communication terminal 3-4 includes a service site 320 of the on-line banking service system. Hereinafter, a communication method related to the communication system 1 illustrated in FIG. 8 will be described.

(Step S101) In the communication terminal 3-3, the application 310 performs input processing of a user ID (identification information) and passwords as a log-in processing to the service site 320. The application 310 transmits the ID and the passwords, which are input from a user, to the service site 320 of the communication terminal 3-4. In the communication terminal 3-4, the service site 320 verifies validity of the ID and the passwords received from the application 310 of the communication terminal 3-3 as log-in processing. In a case where a result of the verification is "passing", the service site 320 proceeds to the subsequent processing. On the other hand, in a case where verification of the ID and the passwords fails, the service site 320 terminates the processing. In a case where verification of the ID and the passwords fails, the service site 320 may execute predetermined error processing.

(Step S102) In the communication terminal 3-3, the application 310 transmits a certification authority public key certificate of a host communication terminal, and a client public key certificate to the service site 320 of the communication terminal 3-4.

(Step S103-1) In the communication terminal 3-4, the service site 320 verifies validity of the certification authority public key certificate received from the application 310 of the communication terminal 3-3 with the root certification authority public key certificate. In a case where a result of the verification is "passing", the service site 320 proceeds to the subsequent processing. On the other hand, verification of the certification authority public key certificate fails, the service site 320 terminates processing. In a case where verification of the certification authority public key certificate fails, the service site 320 may execute predetermined error processing.

(Step S103-2) In the communication terminal 3-4, the service site 320 verifies validity of the client public key certificate received from the application 310 of the communication terminal 3-3 with the certification authority public key certificate of which a verification result is "passing". In a case where a result of the verification is "passing", the service site 320 proceeds to the subsequent processing. On the other hand, in a case where verification of the client public key certificate fails, the service site 320 terminates the processing. In a case where verification of the client public key certificate fails, the service site 320 may execute predetermined error processing.

(Step S104) In the communication terminal 3-4, the service site 320 generates random numbers, and sets the generated random numbers as a challenge value. The service site 320 transmits the challenge value (random numbers) to the application 310 of the communication terminal 3-3.

(Step S105) In the communication terminal 3-3, the application 310 encrypts the challenge value (random numbers) received from the service site 320 of the communication terminal 3-4 with a secret key Ks that forms a pair with a public key of the client public key certificate of the host communication terminal. Encrypting of the challenge value (random numbers) is performed in the secure RAM of the SIM 100-3 of the communication terminal 3-3. The application 310 sets encrypted data Ks (random numbers) that is a result of the encrypting of the challenge value (random numbers) as a response value, and transmits the response value to the service site 320 of the communication terminal 3-4.

(Step S106) In the communication terminal 3-4, the service site 320 verifies validity of the response value Ks (random numbers) received from the application 310 of the communication terminal 3-3 by using the public key of the client public key certificate of the communication terminal 3-3. For example, in a case where a result of decrypting of the response value Ks (random numbers) with the public key matches the challenge value (random numbers), the service site 320 regards the verification as passing. In a case where the result does not match the challenge value (random numbers), the service site 320 regards the verification as failing. In a case where a result of the verification of the response value Ks (random numbers) is "passing", the service site 320 regards that log-in to the service site 320 succeeds. On the other hand, in a case where the verification of the response value Ks (random numbers) fails, the service site 320 regards that log-in to the service site 320 fails. In a case where the verification of the response value Ks (random numbers) fails, the service site 320 may execute predetermined error processing.

According to Example 1, in user authentication, challenge and response verification can be further executed in addition to authentication of the ID and passwords. According to this, since user authentication can be performed by two authentication elements including the ID and password authentication and the challenge and response authentication, reliability of the user authentication is improved. In this regard, in the related art, tools such as a random number table for password update and a time-synchronization type one-time password generation application are used to enhance reliability of authentication of the ID and the passwords. However, according to Example 1, it is not necessary to use the tools.

Example 2

Figure 9:
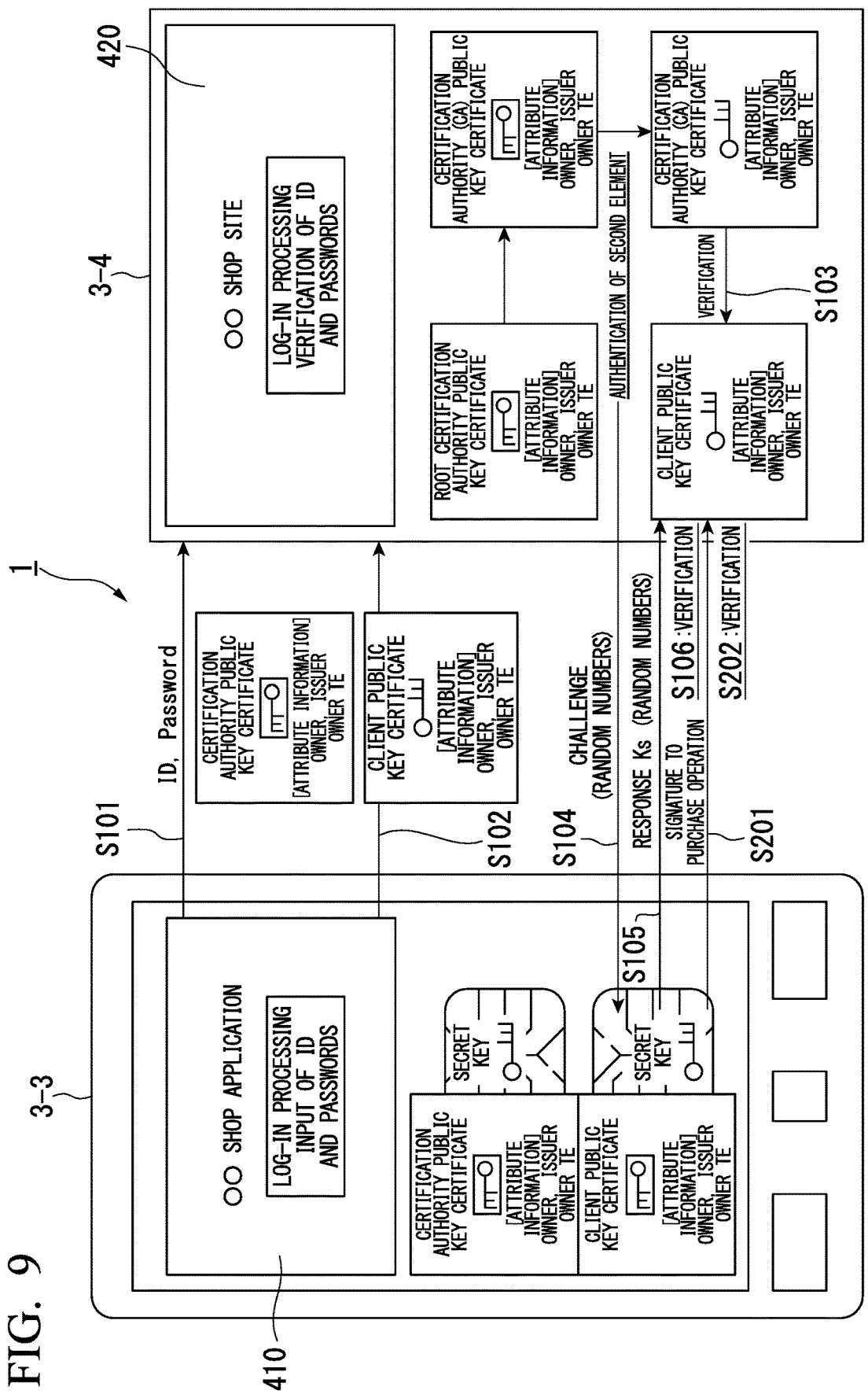
FIG. 9 is a view illustrating an operation of the communication system according to this example.

Example 2 related to the fourth embodiment will be described with reference to FIG. 9. FIG. 9 is a view illustrating a communication system 1 according to Example 2 of the fourth embodiment. The communication system 1 illustrated in FIG. 9 is applied to an on-line shopping service system. In FIG. 9, the communication terminal 3-3 includes an application 410 of the on-line shopping service system. The communication terminal 3-4 includes a service site 420 of the on-line shopping service system.

Hereinafter, a communication method related to the communication system 1 illustrated in FIG. 9 will be described. In FIG. 9, the same reference numerals are given to portions corresponding to respective steps in FIG. 8, and description thereof will be omitted.

In FIG. 9, processing from steps S101 to S106 is executed, and as a result thereof, user authentication passes, and thus log-in to the service site 420 with an ID of the user succeeds. Then, the user executes a purchase operation of on-line shopping with the ID in the service site 420.

(Step S201) In the communication terminal 3-3, the application 410 generates an electronic signature encrypted by the secret key Ks, which forms a pair with the public key of the client public key certificate of the host communication terminal, with respect to a digest that is calculated on the basis of purchase operation information including the purchase operation performed by the user. Generation of the electronic signature is performed in the secure RAM in the SIM 100-3 of the communication terminal 3-3. The application 410 transmits the generated electronic signature of the purchase operation information to the service site 420 of the communication terminal 3-4.

(Step S202) In the communication terminal 3-4, the service site 420 verifies validity of the electronic signature of the purchase operation information, which is received from the application 410 of the communication terminal 3-3, by using the public key of the client public key certificate of the communication terminal 3-3. Specifically, the service site 420 determines whether or not a digest extracted by decrypting the electronic signature of the purchase operation information which is received from the application 410, and a purchase operation information digest that is generated from the purchase operation information that is transmitted from the application 410 and is received by the service site 420 match each other.

In a case where a result of verification of the electronic signature of the purchase operation information is "passing", the service site 420 accepts a purchase operation indicated by the purchase operation information received from the application 410 of the communication terminal 3-3. According to this, the purchase operation performed by the user is executed in the service site 420. On the other hand, verification of the electronic signature of the purchase operation information is "failing", the service site 420 does not accept the purchase operation indicated by the purchase operation information received from the application 410 of the communication terminal 3-3. According to this, the purchase operation performed by the user is not executed in the service site 420. In a case where verification of the electronic signature of the purchase operation information is "failing", the service site 420 may execute predetermined error processing.

According to Example 2, as in Example 1 described above, since user authentication can be performed by two authentication elements including the ID and password authentication and the challenge and response authentication, reliability of the user authentication is improved.

In addition, according to Example 2, in acceptance of the purchase operation, it is possible to confirm validity of the purchase operation through verification of validity of the electronic signature of the purchase operation information. In this regard, in the related art, identity confirmation is performed by using a telephone to confirm validity of the purchase operation. However, according to Example 2, identity confirmation by the telephone may not be performed.

Example 3

Figure 10:
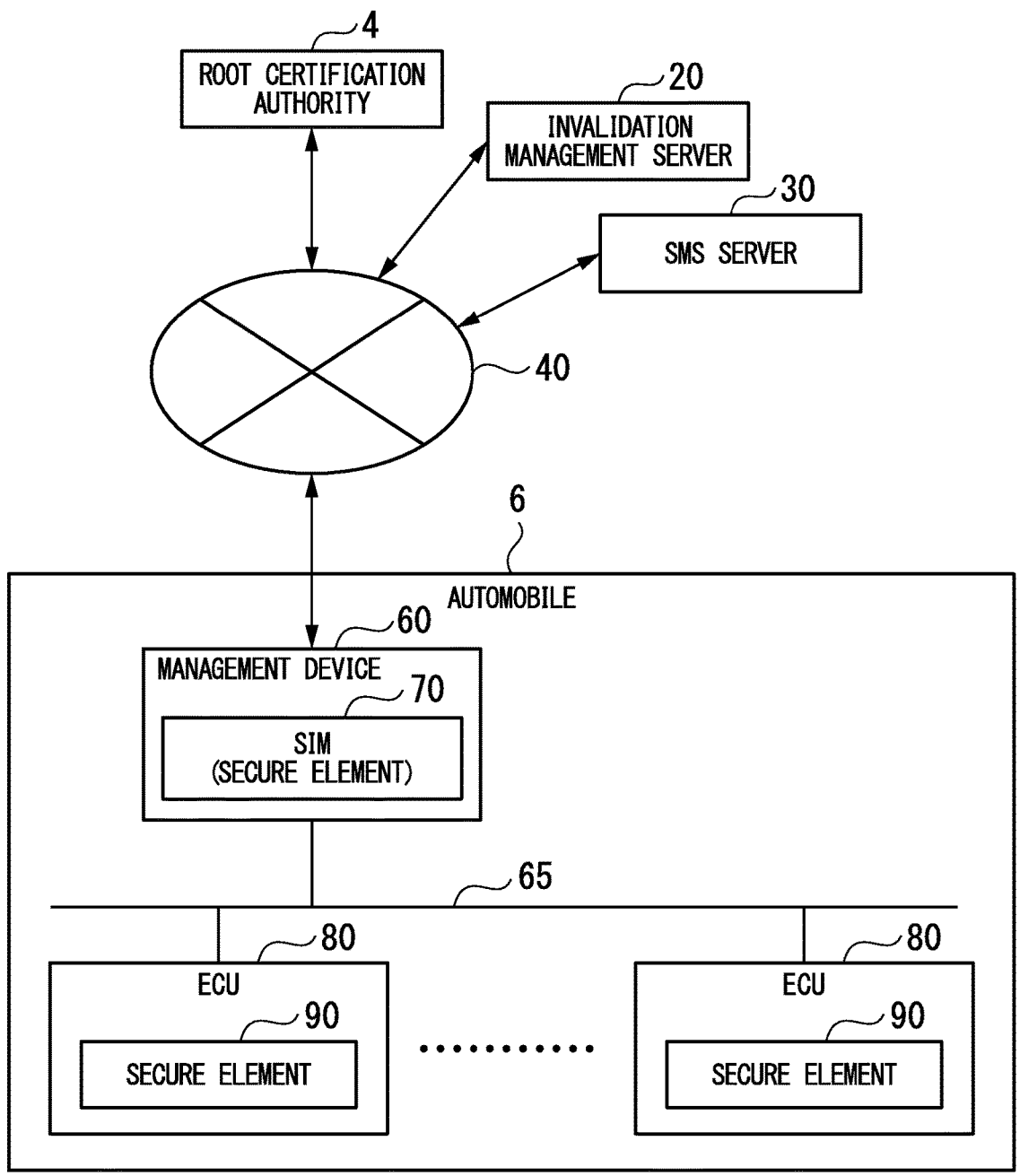
FIG. 10 is a configuration diagram illustrating a communication system according to this example.

Example 3 related to the fourth embodiment will be described with reference to FIG. 10. FIG. 10 is a view illustrating a communication system 1 according to Example 3 of the fourth embodiment. The communication system 1 illustrated in FIG. 10 is applied to an automobile.

In FIG. 10, an automobile 6 includes a management device 60 and an electronic control unit (ECU) 80. The management device 60 is connected to an in-vehicle control network 65. As the in-vehicle control network 65, for example, a controller area network (CAN) is used. The CAN is known as one of a communication network that is mounted on a vehicle. In this embodiment, the in-vehicle control network 65 is the CAN. Various ECUs 80 are connected to the in-vehicle control network 65. Each of the ECUs 80 is an in-vehicle computer that is provided in the automobile 6. Examples of the ECU 80 include a drive-system ECU, an in-vehicle ECU, a safety control-system ECU, and the like. The management device 60 exchanges data between the respective ECUs 80 through the in-vehicle control network 65. Each of the ECUs 80 exchanges data with another ECU 80 through the in-vehicle control network 65.

The management device 60 includes a secure element 70. The ECU 80 includes a secure element 90. The root certification authority 4, the invalidation management server 20, the SMS server 30, and the management device 60 are connected to the communication network 40.

To use the communication network 40, a subscriber identity module (SIM) or an embedded subscriber identity module (eSIM) in which subscriber information of the communication network 40 is written is necessary. The management device 60 includes a SIM_70. The SIM_70 is an SIM in which subscriber information of the communication network 40 is written. Accordingly, the management device 60 can use the communication network 40 by using the SIM_70. The management device 60 is connected to the communication network 40 by a radio communication line that is established by using the SIM_70. The SIM_70 is a secure element.

Furthermore, an exclusive line through the communication network 40 may be established between the management device 60, the root certification authority 4, the invalidation management server 20, and the SMS server 30 so that the management device 60, the root certification authority 4, and the invalidation management server 20, and the SMS server 30 can transmit and receive data through the exclusive line.

Figure 11:
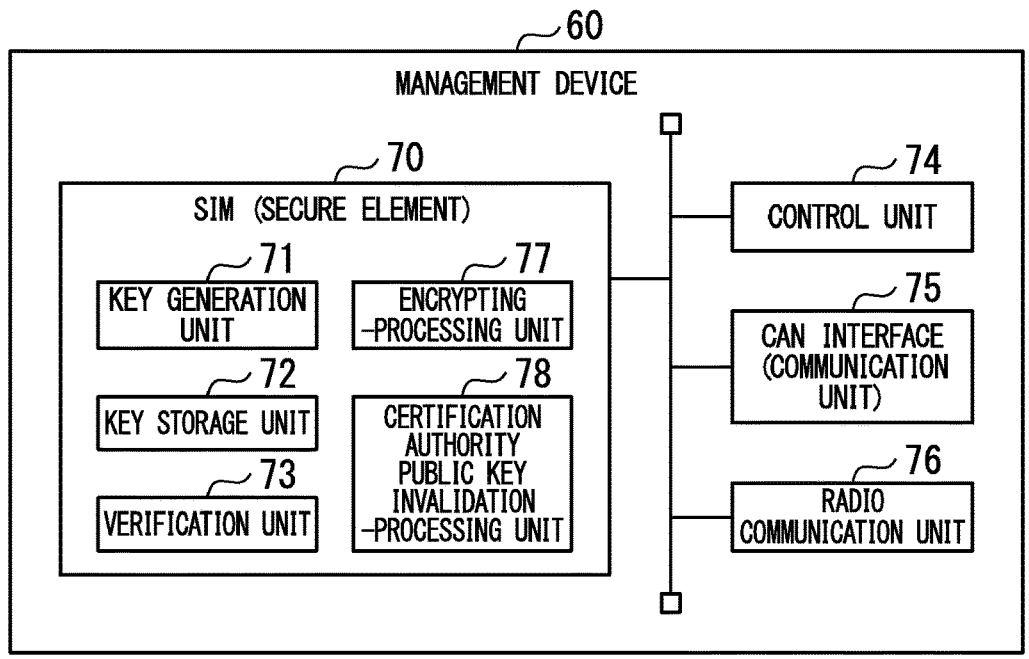
FIG. 11 is a configuration diagram illustrating a management device according to this example.

FIG. 11 is a configuration diagram illustrating the management device 60 according to this example. In FIG. 11, the management device 60 includes a control unit 74, a CAN interface 75, a secure element 70, and a radio communication unit 76.

The respective units have a configuration capable of exchanging data. The secure element 70 includes a key generation unit 71, a key storage unit 72, a verification unit 73, encrypting-processing unit 77, and a certification authority public key invalidation-processing unit 78.

The control unit 74 has a function of controlling the management device 60. The CAN interface 75 is a communication unit that performs communication with the ECU 80. The CAN interface 75 is connected to the in-vehicle control network 65, and exchanges data with the respective ECUs 80 through the in-vehicle control network 65. The secure element 70 has tamper resistance.

The radio communication unit 76 transmits and receives data through radio communication. The SIM_70 is an SIM in which subscriber information of the communication network 40 is written. Accordingly, the radio communication unit 76 is connected to the communication network 40 through a radio communication line by using the SIM_70.

In the secure element 70, the key generation unit 71 generates a key. The key storage unit 72 stores the key. The verification unit 73 performs verification on exchange of data. The encrypting-processing unit 77 performs encrypting of the data and decrypting of encrypted data. The certification authority public key invalidation-processing unit 78 accesses the invalidation management server 20 to acquire the certification authority public key certificate invalidation list 362, and confirms whether or not a certification authority public key certificate transmitted from a communication counterpart is invalidated. In a case where the certification authority public key invalidation-processing unit 78 determines that the certification authority public key certificate is invalidated, the control unit 74 perform control so that communication with the communication counterpart is not performed.

Figure 12:
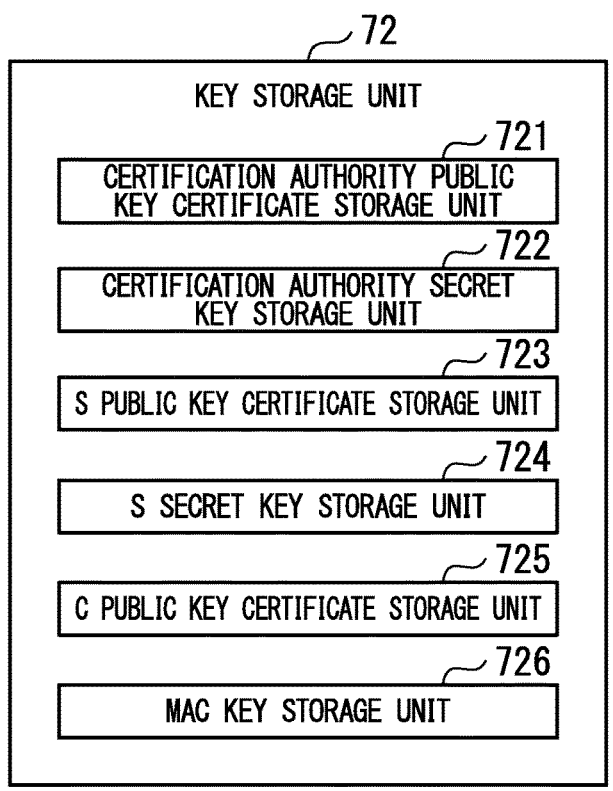
FIG. 12 is a view illustrating an example of a key storage unit of the management device according to this example.

FIG. 12 is a view illustrating a configuration of the key storage unit 72 illustrated in FIG. 11. In FIG. 12, the key storage unit 72 includes a certification authority public key certificate storage unit 721, a certification authority secret key storage unit 722, an S public key certificate storage unit 723, an S secret key storage unit 724, a C public key certificate storage unit 725, and a MAC key storage unit 726.

The certification authority public key certificate storage unit 721 stores a certification authority public key certificate Cert_Kr1p. The certification authority secret key storage unit 722 stores a certification authority secret key Kr1s. The certification authority public key certificate Cert_Kr1p is a certificate of a public key. A public key that is verified by the certification authority public key certificate Cert_Kr1p is a certification authority public key Kr1p. The certification authority secret key Kr1s is a secret key that forms a pair with the certification authority public key Kr1p.

The certification authority public key Kr1p and the certification authority secret key Kr1s are generated by the key generation unit 71 of the secure element 70. In addition, the certification authority public key Kr1p is transmitted to the root certification authority 4, and the root certification authority 4 issues the certification authority public key certificate Cert_Kr1p of the certification authority public key Kr1p. The root certification authority 4 transmits the certification authority public key certificate Cert_Kr1p to the management device 60. The certification authority public key certificate Cert_Kr1p is received by the radio communication unit 76 of the management device 60, and is transmitted to the key storage unit 72 of the secure element 70. The key storage unit 72 acquires the certification authority public key certificate Cert_Kr1p, and writes the certification authority public key certificate Cert_Kr1p in the certification authority public key certificate storage unit 721.

In addition, the certification authority public key Kr1p and the certification authority secret key Kr1s may be generated in the root certification authority 4 and the like on an outer side of the secure element 70, and the certification authority public key certificate Cert_Kr1p of the certification authority public key Kr1p may be issued in the root certification authority 4. In addition, the root certification authority 4 transmits the certification authority public key certificate Cert_Kr1p and the certification authority secret key Kr1s to the management device 60. The certification authority public key certificate Cert_Kr1p and the certification authority secret key Kr1s are received by the radio communication unit 76 of the management device 60, and is transmitted to the key storage unit 72 of the secure element 70. The key storage unit 72 acquires the certification authority public key certificate Cert_Kr1p and the certification authority secret key Kr1s. The key storage unit 72 may write the certification authority public key certificate Cert_Kr1p in the certification authority public key certificate storage unit 721, and may write the certification authority secret key Kr1s in the certification authority secret key storage unit 722. That is, the certification authority public key certificate Cert_Kr1p that is written in the secure element 70 is stored in the certification authority public key certificate storage unit 721. The certification authority secret key Kr1s that is written in the secure element 70 is stored in the certification authority secret key storage unit 722. It is preferable that the certification authority public key certificate Cert_Kr1p and the certification authority secret key Kr1s are managed not to be output from the secure element 70 to the outside as a plane sentence, and is concealed.

The S public key certificate storage unit 723 stores an S public key certificate Cert_KSp. The S secret key storage unit 724 stores an S secret key KSs. The S public key certificate Cert_KSp is a certificate of a public key. A public key that is verified by the S public key certificate Cert_KSp is an S public key KSp. The S secret key KSs is a secret key that forms a pair with the S public key KSp. The S public key certificate Cert_KSp and the S secret key KSs are generated by the key generation unit 71. The S public key certificate Cert_KSp generated by the key generation unit 71 is stored in the S public key certificate storage unit 723. The S secret key KSs generated by the key generation unit 71 is stored in the S secret key storage unit 724.

The C public key certificate storage unit 725 stores a C public key certificate. The C public key certificate exists for every ECU 80. The C public key certificate storage unit 725 stores the C public key certificate of each of the ECUs 80. The C public key certificate of an arbitrary ECU 80 is a certificate of a public key of the ECU 80.

For example, a public key that is verified by a C public key certificate Cert_KC1p of a first ECU 80 that is one of the ECUs 80, which are provided in the automobile 6, is a C public key KC1p. The C public key KC1p is a public key of the first ECU 80. The C public key KC1p forms a pair with a C secret key KC1s that is a secret key of the first ECU 80. The C public key certificate Cert_KC1p received from each of the ECUs 80 is stored in the C public key certificate storage unit 725.

The MAC key storage unit 726 stores an MAC key Km. The MAC key Km is a common key that is generated by the key generation unit 71. The MAC key Km generated by the key generation unit 71 is stored in the MAC key storage unit 726. For example, the MAC key Km is used in exchange of data between the ECUs 80.

Figure 13:
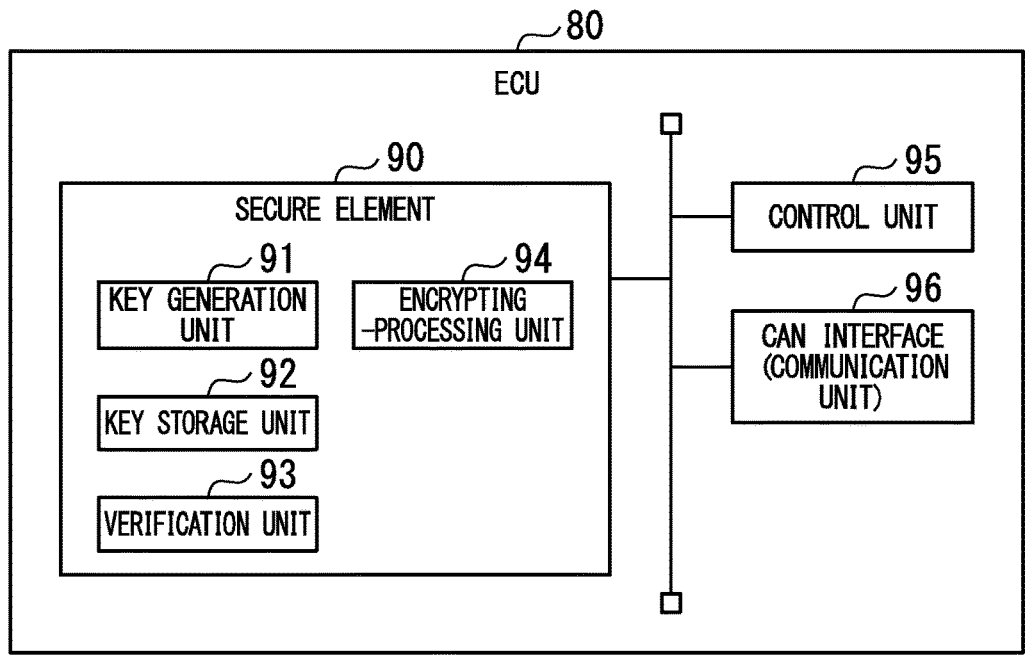
FIG. 13 is a configuration diagram illustrating an ECU according to this example.

FIG. 13 is a configuration diagram illustrating the ECU 80 according to this example. In FIG. 13, the ECU 80 includes a control unit 95, a CAN interface 96, and a secure element 90. The respective units have a configuration capable of exchanging data. The secure element 90 includes a key generation unit 91, a key storage unit 92, a verification unit 93, and an encrypting-processing unit 94.

The control unit 95 has a predetermined control function corresponding to the ECU 80. The CAN interface 96 is a communication unit that performs communication with the management device 60 or another ECU 80. The CAN interface 96 is connected to the in-vehicle control network 65, and exchange data with the management device 60 or the other ECU 80 through the in-vehicle control network 65. The secure element 90 has tamper resistance.

In the secure element 90, the key generation unit 91 generates a key. The key storage unit 92 stores the key. The verification unit 93 performs verification on exchange of data. The encrypting-processing unit 94 performs encrypting of data and decrypting of encrypted data.

Figure 14:
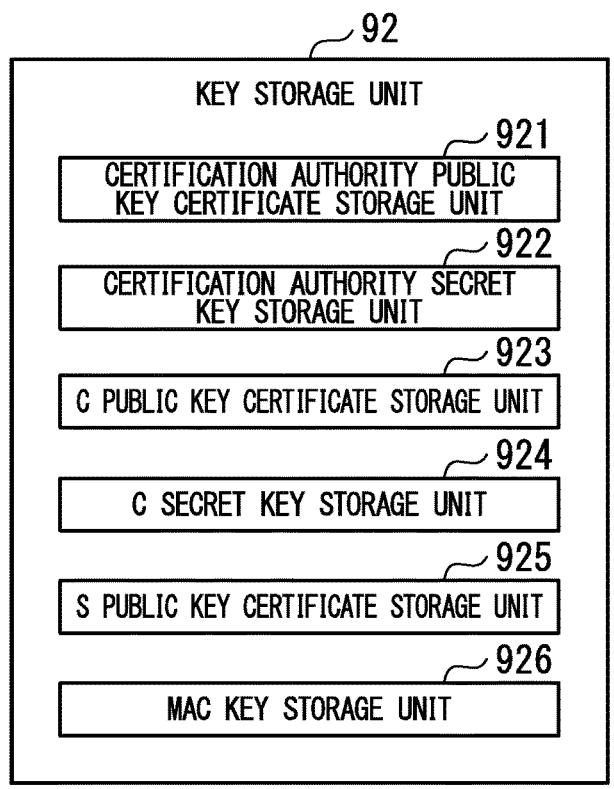
FIG. 14 is a view illustrating an example of a key storage unit of the ECU according to this example.

FIG. 14 is a view illustrating a configuration of the key storage unit 92 illustrated in FIG. 13. In FIG. 14, the key storage unit 92 includes a certification authority public key certificate storage unit 921, a certification authority secret key storage unit 922, a C public key certificate storage unit 923, a C secret key storage unit 924, a S public key certificate storage unit 925, and an MAC key storage unit 926.

The certification authority public key certificate storage unit 921 stores the certification authority public key certificate Cert_Kr1p. The certification authority secret key storage unit 922 stores the certification authority secret key Kr1s. Accordingly, the management device 60 and the ECU 80 include the same pair of the certification authority public key certificate Cert_Kr1p and the certification authority secret key Kr1s.

For example, the certification authority public key certificate Cert_Kr1p and the certification authority secret key Kr1s are acquired from the root certification authority 4, and are safely written in the secure element 90. The certification authority public key certificate Cert_Kr1p that is written in the secure element 90 is stored in the certification authority public key certificate storage unit 921. The certification authority secret key Kr1s that is written in the secure element 90 is stored in the certification authority secret key storage unit 922. It is preferable that the certification authority public key certificate Cert_Kr1p and the certification authority secret key Kr1s are managed not to be output from the secure element 90 to the outside as a plane sentence, and is concealed.

The C public key certificate storage unit 923 stores the C public key certificate. The C secret key storage unit 924 stores a C secret key. The C public key certificate is a certificate of a public key. The C secret key is a secret key that forms a pair with the public key of the C public key certificate. The C public key certificate and the C secret key are generated by the key generation unit 91. The C public key certificate that is generated by the key generation unit 91 is stored in the C public key certificate storage unit 923. The C secret key that is generated by the key generation unit 91 is stored in the C secret key storage unit 924. For example, the C public key certificate Cert_KC1p of the first ECU 80 is a certificate of the C public key CK1p of the first ECU 80. The C public key KC1p forms a pair with the C secret key KC1s of the first ECU 80. The C public key certificate Cert_KC1p that is generated by the key generation unit 91 of the first ECU 80 is stored in the C public key certificate storage unit 923 of the first ECU 80. The C secret key KC1s that is generated by the key generation unit 91 of the first ECU 80 is stored in the C secret key storage unit 924 of the first ECU 80.

The S public key certificate storage unit 925 stores the S public key certificate Cert_KSp of the management device 60. The S public key certificate Cert_KSp received from the management device 60 is stored in the S public key certificate storage unit 925.

The MAC key storage unit 926 stores the MAC key Km. The MAC key Km received from the management device 60 is stored in the MAC key storage unit 926.

In this embodiment, the SIM_70 exchanges data with the root certification authority 4 by the radio communication unit 76 through the communication network 40. The key generation unit 71 generates a certification authority public key and a certification authority secret key. The radio communication unit 76 transmits the certification authority public key to the root certification authority 4. When receiving the certification authority public key transmitted from the management device 60, the root certification authority 4 puts a signature on the certification authority secret key with a root certification authority secret key to create a certification authority public key certificate, and transmits the certification authority public key certificate to the SIM_70.

When transmitting the certification authority public key certificate from the root certification authority 4 to the SIM_70, it is preferable that an exclusive line through the communication network 40 is established between the management device 60 and the root certification authority 4, and data is transmitted and received through the exclusive line that is established. The SIM_70 stores the certification authority public key certificate, which is received from the root certification authority 4, in the certification authority public key certificate storage unit 721. The SIM_70 stores the certification authority secret key, which is generated by the key generation unit 71, in the certification authority secret key storage unit 722.

In addition, in a case of invalidating the certification authority public key certificate that is stored in the SIM_70, the certification authority public key certificate invalidation list 362 may be OTA-transmitted from the invalidation management server 20 to the management device 60.

In addition, in a case of invalidating the certification authority public key certificate that is stored in the SIM_70, the invalidation management server 20 may make a request for the SMS server 30 to allow the management device 60 to acquire the certification authority public key certificate invalidation list 362. In addition, the SMS server 30 transmits a signal to the management device 60 to make a request for the management device 60 to acquire the certification authority public key certificate invalidation list 362. The certification authority public key invalidation-processing unit 78 may access the invalidation management server 20 according to the request signal to acquire the certification authority public key certificate invalidation list 362. In this case, the invalidation management server 20 retains a telephone number of the management device 60. When the certification authority public key certificate invalidation list 362 is acquired by the SMS server 30, on the management device 60 side, processing can be completed at the inside of the SIM 100, and thus it is possible to improve security.

In the above-described examples, description has been given of a case where the SIM_70 exchanges data with the root certification authority 4 by the radio communication unit 76 through the communication network 40, but there is no limitation thereto. For example, the SIM_70 may be connected to the communication network 40 in a wired manner, and may exchange data with the root certification authority 4 through the communication network 40.

According to the examples, the certification authority public key certificate can be transmitted from the root certification authority 4 to the automobile 6 through radio communication. According to this, the certification authority public key certificate that is retained in the automobile 6 can be updated by the root certification authority 4.

Furthermore, the SIM, in which the certification authority secret key Kr1s and the certification authority public key certificate Cert_Kr1p are written by the hardware security module 50, may be mounted on the management device 60 and the ECU 80.

Hereinbefore, embodiments of the invention and modification examples thereof have been described in detail with reference to the accompanying drawings. However, a specific configuration is not limited to the embodiments, and includes design changes and the like in a range not departing from the gist of the invention.

Furthermore, a computer program that realizes the function of the communication device or the communication terminal according to the above-described embodiments may be recorded on a computer-readable recording medium, and the program recorded on the recording medium may be read and executed in a computer system. In addition, the "computer system" stated here may include an OS and hardware such as peripherals.

In addition, the "computer-readable recording medium" represents a writable non-volatile memory such as a flexible disc, an optical-magneto disc, a ROM, and a flash memory, a portable medium such as a digital versatile disc (DVD), and a storage device such as a hard disk that is embedded in the computer system.

In addition, the "computer-readable recording medium" also includes a configuration that retains a program for a constant time as in a volatile memory (for example, a dynamic random-access memory (DRAM)) inside a computer system which becomes a server or a client in a case where a program is transmitted through a network such as the Internet, or a communication line such as a telephone line.

In addition, the program may be transmitted from a computer system capable of storing the program in a storage device and the like to another computer system through a transmission medium or transmission waves in the transmission medium. Here, the "transmission medium" that transmits the program represents a medium having an information transmitting function as in a network (communication network) such as the Internet, or a communication line such as a telephone line.

In addition, the above-described program may be configured to realize parts of the above-described functions.

In addition, the above-described program may be a so-called differential file (differential program) capable of realizing the above-described function in combination with a program that is recorded already in a computer system.

The invention has been described with reference to specific examples and modification examples, but the examples and the modification examples are illustrative only, and it should be understood by those skilled in the art that various modification examples, variation examples, alternative examples, and substitution examples, and the like can be made. For convenience of description, the devices according to the examples of the invention have been described with reference to functional block diagrams, but the devices may be realized by hardware, software, or a combination thereof. The invention is not limited to the examples, and includes various modification examples, variation examples, alternative examples, and substitution examples, and the like without departing from the gist of the invention.

INDUSTRIAL APPLICABILITY

According to the invention, even in a case where a certification authority public key certificate that is managed by an arbitrary SE is leaked, it is possible to reduce an influence on an SE to which the certification authority public key certificate is transmitted.

REFERENCE SIGNS LIST

1 Communication system
3-1, 3-2 Communication device
3-3, 3-4 Communication terminal
4 Root certification authority
6: Automobile
10 Network operator database
20 Invalidation management server
30 SMS server
40 Communication network
50 Hardware security module
60 Management device
80 ECU
100-1 to 100-4 Storage unit
200 Storage unit
500 SIM
101 Key generation unit
102 Public key certificate generation unit
103 Verification unit
104 Encrypting-processing unit
105 Certification authority key storage unit
106 Secret key storage unit
107 Log-in-processing unit
108 Certification authority key generation unit
109 Certification authority public key certificate acquisition unit
78, 110 Certification authority public key invalidation-processing unit
130, 330, 530 Communication unit
235 Communication unit
140, 340, 540 Control unit
245 Control unit
155 Authentication-processing unit
160 Radio communication unit
170 Certification authority key generation unit
202 Certification authority public key certificate generation unit
205, 505 Root certification authority key storage unit
210 Certification authority
360 Storage unit

The invention claimed is:

1. A communication system, comprising:
a plurality of terminal devices; and
a root certification authority,
wherein each of the plurality of terminal devices includes,
a certification authority key generation unit configured to generate a certification authority public key and a certification authority secret key that forms a pair with the certification authority public key,
a certification authority public key certificate acquisition unit configured to transmit information, to which the certification authority public key generated by the certification authority key generation unit is attached and which makes a request for a certification authority public key certificate, to the root certification authority, and acquire the certification authority public key certificate transmitted from the root certification authority in response to the request,
a certification authority key storage unit configured to store the certification authority public key certificate that is acquired by the certification authority public key certificate acquisition unit, and the certification authority secret key,
a transmission unit configured to transmit, to another terminal device, the certification authority public key certificate, which is stored in the certification authority key storage unit, and a public key certificate of own terminal device, and
a verification unit configured to verify the certification authority public key certificate, which is transmitted from the other terminal device, with a root certification authority public key certificate, and verify a user of the other terminal device by further verifying the public key certificate transmitted from the other terminal device using the certification authority public key acquired from the certification authority public key certificate for which verification succeeds in a case where verification of the certification authority public key certificate succeeds,
the root certification authority includes,
a root certification authority key storage unit configured to store the root certification authority public key certificate, and a root certification authority secret key,
a communication unit configured to receive information that is transmitted from each of the plurality of terminal devices for making the request for the certification authority public key certificate, and
a certification authority public key certificate generation unit configured to generate the certification authority public key certificate by encrypting the certification authority public key received by the communication unit with the root certification authority secret key stored in the root certification authority key storage unit, and the communication unit transmits the certification authority public key certificate generated by the certification authority public key certificate generation unit to a terminal device that makes the request for the certification authority public key certificate.

2. The communication system according to claim 1, wherein each of the plurality of terminal devices further includes, a certification authority public key invalidation-processing unit configured to acquire a certification authority public key certificate invalidation list from an invalidation management server that stores the certification authority public key certificate invalidation list including the certification authority public key certificate that is invalidated, and determine whether or not the certification authority public key certificate transmitted from the other terminal device is invalidated, and in a case where the certification authority public key invalidation-processing unit determines that the certification authority public key certificate transmitted from the other terminal device is not invalidated, the verification unit verifies the certification authority public key certificate transmitted from the other terminal device with the root certification authority public key certificate.

3. The communication system according to claim 2, wherein the certification authority public key invalidation-processing unit is configured to acquire the certification authority public key certificate invalidation list that is over-the-air (OTA)-transmitted by the invalidation management server.

4. The communication system according to claim 2, wherein the certification authority public key invalidation-processing unit is configured to acquire the certification authority public key certificate invalidation list by accessing the invalidation management server in accordance with a signal that is transmitted from an SMS server that provides a short message service for making a request for acquisition of the certification authority public key certificate invalidation list.

5. A communication method that is executed by a communication system including a plurality of terminal devices and a root certification authority, wherein each of the plurality of terminal devices, generates a certification authority public key and a certification authority secret key that forms a pair with the certification authority public key, transmits information, to which the certification authority public key is attached and which makes a request for a certification authority public key certificate, to the root certification authority, and acquires the certification authority public key certificate transmitted from the root certification authority in response to the request, stores the certification authority public key certificate and the certification authority secret key, transmits, to another terminal device, the certification authority public key certificate that is stored and a public key certificate of own terminal device, verifies the certification authority public key certificate, which is transmitted from the other terminal device, with a root certification authority public key certificate, and verifies a user of the other terminal device by further verifying the public key certificate transmitted from the other terminal device using the certification authority public key acquired from the certification authority public key certificate for which verification succeeds in a case where verification of the certification authority public key certificate succeeds, and the root certification authority, receives information that is transmitted from each of the plurality of terminal devices for making the request for the certification authority public key certificate, generates the certification authority public key certificate by encrypting the certification authority public key, which is received, with the root certification authority secret key that is stored in a root certification authority key storage unit that stores the root certification authority public key certificate and the root certification authority secret key, and transmits the certification authority public key certificate to a terminal device that makes the request for the certification authority public key certificate.

* * * * *